United States Patent
Canright et al.

(10) Patent No.: US 12,534,603 B2
(45) Date of Patent: Jan. 27, 2026

(54) HIGH DENSITY POLYETHYLENE COMPOSITIONS WITH EXCEPTIONAL PHYSICAL PROPERTIES

(71) Applicant: ExxonMobil Chemical Patents Inc., Baytown, TX (US)

(72) Inventors: Robert M. Canright, Huffman, TX (US); Nino Ruocco, Houston, TX (US)

(73) Assignee: Exxon Mobil Corporation, Spring, TX (US)

( * ) Notice: Subject to any disclaimer, the term of this patent is extended or adjusted under 35 U.S.C. 154(b) by 458 days.

(21) Appl. No.: 18/007,411

(22) PCT Filed: Jul. 26, 2021

(86) PCT No.: PCT/US2021/070957
§ 371 (c)(1),
(2) Date: Jan. 30, 2023

(87) PCT Pub. No.: WO2022/047449
PCT Pub. Date: Mar. 3, 2022

(65) Prior Publication Data
US 2023/0272195 A1 Aug. 31, 2023

Related U.S. Application Data

(60) Provisional application No. 63/070,171, filed on Aug. 25, 2020.

(51) Int. Cl.
*C08L 23/0807* (2025.01)

(52) U.S. Cl.
CPC ..... *C08L 23/0815* (2013.01); *C08L 2205/025* (2013.01); *C08L 2207/062* (2013.01); *C08L 2207/20* (2013.01)

(58) Field of Classification Search
CPC ...... C08L 23/04; C08L 23/08; C08L 23/0807; C08L 23/0815; C08L 23/0823; C08L 23/083; C08L 23/0838; C08F 210/02; C08F 2500/055
See application file for complete search history.

(56) References Cited

U.S. PATENT DOCUMENTS

| | | | |
|---|---|---|---|
| 7,312,283 B2 | 12/2007 | Martin et al. | |
| 7,875,691 B2 | 1/2011 | Svein et al. | |
| 9,475,898 B2 | 10/2016 | Rohatgi | |
| 9,493,589 B1 | 11/2016 | Greco et al. | |
| 10,184,018 B2 | 1/2019 | Hlavinka et al. | |
| 2005/0119426 A1 | 6/2005 | Roger et al. | |
| 2005/0267249 A1* | 12/2005 | Wilson | C08L 23/06 524/502 |
| 2010/0133714 A1 | 6/2010 | Jaker et al. | |
| 2016/0145360 A1 | 5/2016 | Hamed et al. | |
| 2020/0048381 A1 | 2/2020 | Sun et al. | |
| 2020/0055966 A1 | 2/2020 | Lin et al. | |
| 2020/0115533 A1 | 4/2020 | Beaulieu et al. | |
| 2020/0190238 A1 | 6/2020 | Lee et al. | |
| 2020/0224014 A1 | 7/2020 | Kamplain et al. | |
| 2020/0277474 A1 | 9/2020 | Lin et al. | |
| 2021/0147660 A1 | 5/2021 | Tran et al. | |

FOREIGN PATENT DOCUMENTS

| | | |
|---|---|---|
| TH | 85604 A | 7/2007 |
| WO | 2020020716 | 1/2020 |

\* cited by examiner

*Primary Examiner* — Jeffrey S Lenihan
(74) *Attorney, Agent, or Firm* — C. Tumey Law Group PLLC

(57) ABSTRACT

Provided herein are polyethylene compositions with unimodal molecular weight distribution exhibiting an excellent balance of physical properties. The polyethylene compositions may have density of 0.935 to 0.975 g/cm$^3$ and Melt Index ($I_{2.16}$) of 0.1 to 1 g/10 min. Polyethylene compositions of certain embodiments may exhibit environmental stress crack resistance (ESCR, 10% Igepal, ASTM D1693 Cond. B) within the range from 45 to 80 hours, and/or (ESCR, 100% igepal, ASTM D1693 Cond. B) within the range from 70 to 250 hours. Such ESCR outperforms other unimodal resins of similar melt index and density, approaching ESCR performance of more expensive and complex resins with bimodal molecular weight distribution. The polyethylene compositions of certain embodiments may have two distinct crystalline fractions as shown by temperature rising elution fractionation (TREF).

18 Claims, 6 Drawing Sheets

HIGH DENSITY POLYETHYLENE COMPOSITIONS WITH EXCEPTIONAL PHYSICAL PROPERTIES

CROSS-REFERENCE OF RELATED APPLICATIONS

This application is a National Phase Application claiming priority to PCT Application Serial No. PCT/US2021/070957, filed Jul. 26, 2021, which claims the benefit of U.S. Provisional Application 63/070,171 filed Aug. 25, 2020 entitled "High Density Polyethylene Compositions With Exceptional Physical Properties", the entireties of which are incorporated by reference herein.

FIELD

The present disclosure relates to polyolefin compositions, and in particular polyethylene homo- and co-polymers, and articles including such polyolefin compositions.

BACKGROUND

High density polyethylene (HDPE) polymer compositions are in high demand for many applications, including various films, pipes (e.g., pressure pipe, corrugated pipe, raised temperature resistance or PE-RT pipe), and blow molding. Higher density is beneficial to mechanical strength in many of these applications (e.g., to hold the internal pressure of a pipe), but impacts stress crack resistance negatively.

Stress crack resistance (SCR), demonstrated by good performance in the Environmental Stress Crack Resistance (ESCR) and Notched Constant Ligament-Stress (NCLS) tests, is particularly important for HDPE-based pipe applications and recent industry specifications, e.g., ISO PE 100, and are stringent in this respect. Strong SCR performance reduces the possibility of a pipe or blow molded article failing mechanically or structurally over the course of its lifetime. Additionally, strong SCR performance can provide lightweight blow molded articles (e.g., drums, containers, fuel tanks) and downgauge films, reducing material consumption and yielding significant cost savings.

Typically, HDPE materials follow a trend of SCR as a function of density and melt index (MI); the greater the density and higher the MI the lower the SCR of the HDPE/material.

Some solutions to this include multimodal HDPE compositions having low- and high-molecular weight fractions, to achieve a balance of properties. However, multimodal HDPE compositions tend to be substantially more expensive due to greater complexity in their production, greater lot to lot variation, and different processing characteristics than unimodal resins.

At the same time, many recent efforts focus on increased use of post-consumer recycled (PCR) polymer material in forming articles (e.g., blow molded articles, pipes, films, and the like). PCR material alone, however, frequently offers greatly inferior properties to virgin polymer, including SCR and other mechanical properties (in the context of PCR replacements for virgin HDPE polymer). A strategy of incorporating or blending PCR into virgin polymer is often deployed, to achieve a balance of sufficient mechanical and other properties, while reducing the quantity of virgin polymer needed for a given application. However, incorporating any substantial portion of PCR into an HDPE material still significantly increases the likelihood of stress crack failure events.

References of potential interest in this area include; U.S. Pat. No. 9,493,589; US 2020/0224014; US 2020/0190238; US 2020/0115533; WO 2017/112503: WO 2019/229209; WO 2020/020716.

There is a need for new polyolefin compositions, especially new HDPE compositions, which can achieve superior stress crack resistance without the cost of bimodal or multimodal solutions presently available. Such compositions also would ideally enable greater incorporation of PCR material without detrimentally sacrificing SCR and other physical properties.

SUMMARY in some embodiments, the present disclosure provides a polyethylene composition having a density within the range from 0.935 to 0.975 g/cm$^3$ and Melt index ($I_{2.16}$) within the range from 0.1 to 1 g/10 min. The polyethylene composition may have unimodal molecular weight distribution, while exhibiting surprisingly high Environmental Stress Crack Resistance (ESCR) values comparable to those of polyethylene compositions having bimodal molecular weight distribution (such as ESCR determined per ASTM D1693 Cond. B, 10% Igepal, within the range from 45 to 80 hours; and/or ESCR determined per ASTM D1693 Cond. B, 100% Igepal, within the range from 70 to 250 hours).

In yet further embodiments, the polyethylene composition may also or instead have multiple distinct crystalline fractions as shown by Temperature Rising Elution Fractionation (TREF) plots of dW/dT (derivative of wt % with respect to temperature) vs. T (° C.). For instance, the multiple distinct crystalline fractions may comprise (a) a first crystalline fraction having a peak at T1° C. on a TREF curve and a second crystalline fraction having a peak at T2° C. on the TREF curve, with a local minimum at T3° C. defining a valley between the first and second fraction's peaks, further wherein T1 is within the range from 88° C. to 92° C., T2 is within the range from 94° C. to 100° C., and T3 is within the range from 91° C. to 94° C.; provided further that T3−T1>1° C. and T2−T1>5.5° C. The area A1 under the 1D TREF curve (bounded by T=40° C. and T=T3° C.) and the area A2 under the 1D TREF curve (bounded by T=T3° C. and T=120° C.) are such that A1 is at least 15% of the total area A1+A2.

DETAILED DESCRIPTION

Figure 1:
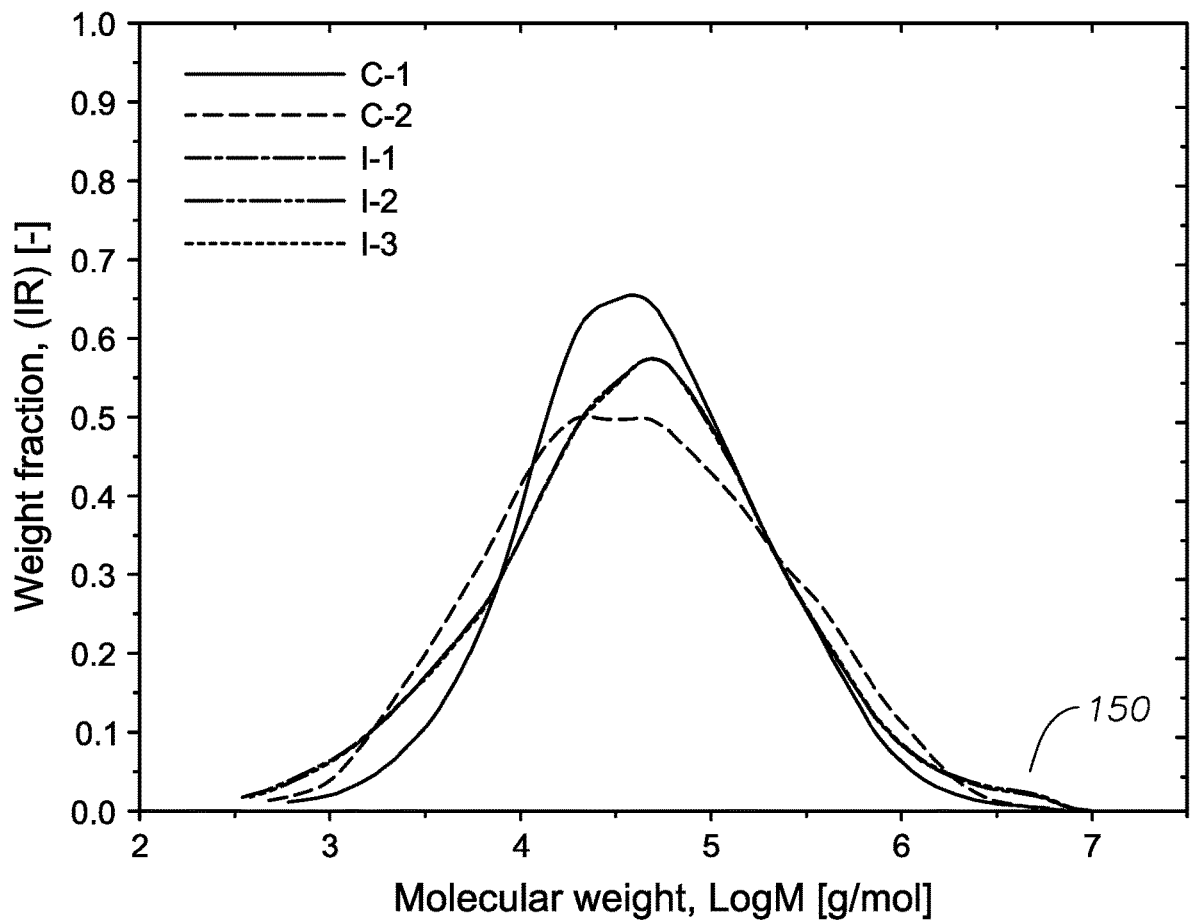
FIG. 1 is a chart illustrating molecular weight distribution determined per GPC 4D of polyethylene compositions in accordance with various embodiments of the present disclosure as well as comparative resins.

The present disclosure relates to polyolefin compositions and articles including the polyolefin compositions.

Polyethylene compositions in accordance with the present disclosure are homopolymers of polyethylene, or copolymers of majority ethylene (e.g., 80, 85, 90, 95, 98, 99 wt % or more ethylene-derived units, preferably 98 wt % or more) and one or more $C_3$ to $C_{40}$ comonomers (e.g., 1-butene, 1-hexene, 1-octene). Preferably, such polyethylene compositions are high density polyethylene (HDPE) compositions (e.g., having density 0.930 g/cc or higher) with melt index (MI, 2.16 kg—also referred to as $I_2$ or $I_{2.16}$) within the range from about 0.20 to about 1.0. These polyethylene compositions furthermore are preferably unimodal with respect to molecular weight distribution (as opposed to the more expensive and more complex-to-produce bimodal solutions noted previously), and/or made in a single reactor (again, as opposed to many bimodal or multimodal solutions, which are made in two or more reactors, with each "mode" or fraction attributed to the product of one of the reactors). At the same time, even though made in a single reactor, polyethylene compositions of the present disclosure may have at least two distinct crystalline portions or fractions of the polyethylene composition when analyzed by 1-D temperature-rising elution fractionation (TREF). Further, the polyethylene compositions may include trace, but detectable, amounts of titanium and/or chromium (such as about 2 ppm to about 4 ppm or 5 ppm Cr; and/or about 5 or 6 ppm to about 15 or 20 ppm Ti, said ppm values based on total mass of the polyethylene composition).

Without wishing to be bound by theory, it is believed that such polyethylene compositions are "hybrid" compositions that, while unimodal in their molecular weight distribution (and/or, made in a single reactor or single reaction step), achieve many of the property advantages normally associated with compositions having multimodal molecular weight distributions (e.g., bimodal, such as those made in multiple series reactors or series reactor steps).

For instance, polyethylene compositions in accordance with the present disclosure advantageously exhibit greatly superior Environmental Stress Crack Resistance (ESCR) as compared to other unimodal polyethylene compositions with similar MI and density. Typically, ESCR is considered a function primarily of MI and density, making this a surprising result of the present polyethylene compositions, suggesting that another property of these compositions lends to their excellent ESCR performance. This is particularly surprising, as one typically expects that greater ESCR is achieved by inclusion of particularly high molecular weight chains (e.g., a high molecular weight fraction in a bimodal polyethylene composition), with greater comonomer incorporation on those higher molecular weight chains. However, the present polyethylene compositions in many embodiments also do not appear to have high comonomer inclusion in their higher molecular weight chains, and at any rate have very low overall comonomer content (e.g., less than 2 wt %, preferably 1 wt % or less). On the other hand, polyethylene compositions of various embodiments also exhibit impact properties superior to those of bimodal polyethylene compositions, and which instead favorably compare with unimodal polyethylene compositions. Thus, the present polyethylene compositions achieve a superior balance of properties—approaching bimodal grades in terms of stress crack resistance, while approaching unimodal grades (and exceed bimodal grades) in terms of their impact properties.

Furthermore, in particular embodiments, the present unimodal polyethylene compositions prove to be superior blending partners for post-consumer recycled (PCR) polymer materials. For instance, blending up to 40, 50, 60, or even 70 wt % PCR polymer material with the present polyethylene composition (said wt % based upon sum of PCR polymer material and polyethylene composition blended together) permits one to maintain much of the desired properties of the present polyethylene composition. This opens up many possibilities for substantially higher inclusion of PCR materials in various articles (e.g., films, bottles, cups, drums, jerry cans, drainage pipe, and bags,), while not making the typically associated sacrifice of desired properties of polymers in those articles (e.g., ESCR, flexural properties, stiffness, op load, and impact properties).

Definitions

The term "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "α-olefin" refers to an olefin having a terminal carbon-to-carbon double bond in the structure thereof. $R^1R^2C=CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group.

For the purposes of the present disclosure, ethylene shall be considered an α-olefin.

When a polymer or copolymer is referred to herein as comprising an alpha-olefin (or α-olefin), including, but not limited to ethylene, 1-butene, and 1-hexene, the olefin present in such polymer or copolymer is the polymerized form of the olefin. For example, when a polymer is said to have an "ethylene content" or "ethylene monomer content" of 80 to 99.9 wt %, or to comprise "ethylene-derived units" at 80 to 99.9 wt %, it is understood that the mer unit in the copolymer is derived from ethylene in the polymerization reaction and said derived units are present at 80 to 99.9 wt %, based upon the weight of ethylene content plus comonomer content.

As used herein, and unless otherwise specified, the term "C" means hydrocarbon(s) having n carbon atom(s) per molecule, wherein n is a positive integer.

Polyethylene Compositions

In at least one embodiment, a process described herein produces polyethylene compositions including polyethylene homopolymers, and/or copolymers of ethylene and one, two, three, four or more $C_3$ to $C_{40}$ olefin comonomers, for example, $C_3$ to $C_{20}$ α-olefin comonomers.

For example, the polyethylene compositions may include copolymers of a $C_2$ to $C_{40}$ olefin and one, two or three or more different $C_2$ to $C_{40}$ olefins. In particular embodiments, the polyethylene compositions comprise a majority of units derived from polyethylene, and units derived from one or more $C_3$ to $C_{40}$ comonomers, preferably $C_3$ to $C_{20}$ α-olefin comonomers (e.g., propylene, 1-butene, 1-hexene, 1-octene, 1-decene, 1-dodecene, preferably propylene, 1-butene, 1-hexene, 1-octene, or a mixture thereof; most preferably 1-butene and/or 1-hexene).

The polyethylene composition may comprise the ethylene-derived units in an so amount of at least 80 wt %, or 85 wt %, preferably at least 90, 95, 96, 97, 98, or 99 wt % (for instance, in a range from a low of 80, 85, 90, 95, 98, 99.0, 99.1, 99.2, 99.3, or 99.4 wt %, to a high of 96, 97, 98.1, 98, 98.2, 98.3, 98.4, 98.5, 98.6, 98.7, 98.8, 98.9, 99.0, 99.1, 99.2, 99.3, 99.4, 99.5, 99.6, 99.7, 99.8, or 99.9 wt %, with ranges from any foregoing low end to any foregoing high end contemplated, provided the high is greater than the low). For instance, the polyethylene composition may comprise 95, 98, 98.5, 99, 99.1, 99.2, or 99.3 to 99.9 wt % ethylene-derived units. Comonomer units (e.g., $C_2$ to $C_{20}$ α-olefin-derived units, such as units derived from butene, hexene, and/or octane) may be present in the polyethylene composition within the range from a low of 0.1, 0.2, 0.3, 0.4, 0.5, 0.6, 0.7, 0.8, 0.9, 1.0, 2.0, 3.0, 4.0, or 5.0 wt %, to a high of 0.7, 0.8, 0.9, 1, 1.1, 1.2, 1.3, 1.4, 1.5, 1.6, 1.7, 1.8, 1.9, 2, 3, 4, 5, 10, 15, or 20 wt %, with ranges from any foregoing low ends to any foregoing high ends contemplated, provided the high is greater than the low end). For instance, the polyethylene composition may comprise 0.1 wt % to 0.7, 0.8 0.9, 1.0, 1.5, or 5.0 wt % comonomer units.

Several suitable comonomers were already noted, although in various embodiments, other α-olefin comonomers are contemplated. For example, the α-olefin comonomer can be linear or branched, and two or more comonomers can be used, if desired. Examples of suitable comonomers include linear $C_3$-$C_{20}$ α-olefins (such as butene, hexene, octane as already noted), and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

In various embodiments, the polyethylene composition also comprises trace, but detectable, amounts of titanium and/or chromium. For instance, polyethylene compositions may include Cr in an amount from a low of 2.0, 2.1, 2.2, 2.3, 2.4, or 2.5 ppm to a high of 3.5, 3.6, 3.7, 3.8, 3.9, 4.0, 4.5, or 5.0 ppm (on the basis of mass of the polyethylene composition), with ranges from any foregoing low to any foregoing high contemplated herein. Likewise, polyethylene compositions may include Ti in an amount from a low of 5, 6, 7, or 8 ppm to a high of 13, 14, 15, 16, 17, 18, 19, or 20 ppm, also with ranges from any foregoing low to any foregoing high contemplated herein.

Polyethylene Composition—Molecular Characteristics

A polyethylene composition according to various embodiments can have a density of 0.930 to 0.975 g/cm$^3$, such as 0.938 to 0.965 g/cm$^3$. For example, ethylene polymers may have a density from a low end of 0.935, 0.938, 0.940, 0.945, 0.950, 0.952, 0.953, 0.954, or 0.955 g/cm$^3$ to a high end of 0.957, 0.958, 0.959, 0.960, 0.965, 0.970 or 0.975 g/cm$^3$, with ranges of various embodiments including any combination of any upper or lower value disclosed herein. Density herein is measured according to ASTM D1505-19 (gradient density) using a density-gradient column on a plaque. The plaque is molded according to ASTM D4703-10a, procedure C, and the plaque is conditioned for at least 40 hours at 23° C. to approach equilibrium crystallinity in accordance with ASTM D618-08.

In various embodiments, the polyethylene composition has one or more, two or more, or, preferably, all of the following molecular weight properties:

weight-average molecular weight (Mw) within the range generally from 90,000 to 300,000, such as from a low end of any one of 100,000 g/mol; 110.000 g/mol; 120,000 g/mol; 130,000 g/mol; 140,000 g/mol; 150,000 g/mol; and 160,000 g/mol, to a high end of any one of 160,000 g/mol; 170,000 g/mol; 180,000 g/mol; 190,000 g/mol; 200,000 g/mol; 210,000 g/mol; 225,000 g/mol; 250,000; and 300,000 g/mol. Ranges from any one of the foregoing low ends to any one of the high ends are contemplated in various embodiments, provided the high end is greater than the low end. For example, Mw can be within the range from 130,000 to 300,000 g/mol in particular embodiments, such as 150,000 g/mol to 180,000; 200,000; 225,000; or 250,000 g/mol.

number-average molecular weight (Mn) generally within the range from 5,000 to 30,000, such as from a low end of any one of 5.000 g/mol; 6,000 g/mol; 7,000 g/mol; 8,000 g/mol; 9,000 g/mol, to a high end of any one of 10,000 g/mol; 11,000 g/mol; 12,000 g/mol; 13,000 g/mol; 14,000 g/mol; 15,000 g/mol; 17,500 g/mol; 20,000 g/mol; 22,500 g/mol; 25,000 g/mol; 27,500 g/mol; and 30,000 g/mol. Ranges from any one of the foregoing low ends to any one of the high ends are contemplated in various embodiments (for instance, Mn may be within the range from 5,000 g/mol to 15,000 g/mol, such as 5,000 or 6,000 g/mol to 11,000 or 12,000 g/mol). More generally, in some embodiments. Mn may be 12.000 g/mol or less, such as 11,000 g/mol or less.

Z-average molecular weight (Mz) generally within the range from 700.000 to 3.0M g/mol, such as from a low end of any one of 700,000 g/mol; 800,000 g/mol; 900,000 g/mol; 1.0M g/mol; 1.1M g/mol; 1.2M g/mol; 1.3M g/mol; 1.40M g/mol; 1.45M g/mol; 1.50M g/mol; 1.55M g/mol; and 1.60M g/mol, to a high end of any one of 1.65M g/mol; 1.70M g/mol; 1.75M g/mol; 1.80M g/mol; 1.85M g/mol; 1.90M g/mol; 1.95M g/mol; 2.0M g/mol; 2.5M g/mol; 2.75M g/mol; and 3.0M g/mol. Ranges from any one of the foregoing low ends to any one of the high ends are contemplated in various embodiments (for instance. Mz may be within the range from 1.0M to 3.0M g/mol, such as 1.5M to 3.0M g/mol; or 1.50M to 2.0M g/mol, such as 1.60M to 1.65M g/mol). In particular embodiments, Mz may be at least 1.0M g/mol, such as at least 1.50M g/mol, or at least 1.60M g/mol, with no upper limit necessarily contemplated.

Z-plus-one average molecular weight ($M_{z+1}$) within the range from a low end of any one of 2.75M, 3.0M, 3.25M, 3.5M, or 3.75M g/mol, to a high end of any one of 4.0M, 4.1M, 4.2M, or 4.5M g/mol, with ranges from any one of the foregoing low ends to any one of the foregoing high ends contemplated (e.g., 3.5M g/mol to 4.2M g/mol, or 2.75M g/mol to 4.5M g/mol, such as 3.75M to 4.5M g/mol). In certain embodiments, $M_{Z+1}$ may be at least 3.5M, such as at least 3.75M, g/mol, with no upper limit necessarily contemplated.

Furthermore, polyethylene compositions in accordance with various embodiments may have Mw/Mn value (sometimes also referred to as polydispersity index, PDI) within the range from 10, 12, 15, or 16 to 17, 18, 19, 20, 22, 25, 26, or 27 (with ranges from any low end any high end contemplated, such as Mw/Mn from 12 to 25, or 15 to 20). Similarly, Mz/Mw ratio of the polyethylene compositions of various embodiments are within the range from 5, 6, 7, 8, or 9 to 10, 11, 12, 13, 14, 15, 17, or 20 (with ranges from any low end to any high end contemplated, such as Mz/Mw from 5 to 15, such as from 7 to 12). Mz/Mn ratio (indicating the broadness of the overall distribution of molecular weights among chains within the polymer by considering the two characteristic values of very high molecular-weight chains (Mz) and very low molecular-weight chains (Mn)) may be within a range from 100, 110, 115, 120, 125, 130, 135 or 140; to 150, 160, 170, 180, 190, 200, 250, 300, 350, or 400 (with ranges from any low end to any high end contemplated, such as Mz/Mn from 110 to 250, or from 130 to 200, such as 140 to 160). In certain embodiments, Mz/Mw ratio may be at least 8, 9, or 10, without a particular upper bound necessarily required. Similarly, in certain embodiments, Mz/Mn ratio may be at least 130, such as at least 140, at least 145, 150, or at least 160, without any upper bound necessarily required.

Furthermore, as noted, the polyethylene compositions of various embodiments described herein exhibit unimodal molecular weight distribution, meaning that there is a single distinguishable peak in a molecular weight distribution curve of the composition (as determined using gel permeation chromatography (GPC) or other recognized analytical technique, noting that if there is any conflict between or among analytical techniques, a molecular weight distribution determined by GPC, as described below, shall control). Examples of "unimodal" molecular weight distribution can be seen in U.S. Pat. No. 8,691,715, FIG. 6 of such patent, which is incorporated herein by reference. This is in contrast with a "multimodal" molecular weight distribution, which means that there are at least two distinguishable peaks in a molecular weight distribution curve (again, as determined by GPC or any other recognized analytical technique, with GPC controlling in the event of any conflict). For example, if there are two distinguishable peaks in the molecular weight distribution curve such composition may be referred to as bimodal composition. For example, in the '715 Patent, FIGS. 1-5 of that Patent illustrate representative bimodal molecular weight distribution curves. In these figures, there is a valley between the peaks, and the peaks can be separated or deconvoluted. Often, a bimodal molecular weight distribution is characterized as having an identifiable high molecular weight component (or distribution) and an identifiable low molecular weight component (or distribution). See also FIG. 1 herein for an example of molecular weight distribution of example polyethylene composition embodiments (I-1, I-2, and I-3) in accordance with the present disclosure, as well as comparative HDPE C-1, wherein the distribution of each of the foregoing exhibits a single peak for those example compositions; while in contrast comparative HDPE C-2 of FIG. 1 has a bimodal distribution (at the center of the molecular weight distribution chart, one can see two peaks for C-2).

In addition to exhibiting unimodal distribution of molecular weight, in particular embodiments, the polyethylene composition may exhibit a long "high-molecular weight tail" in a plot of molecular weight fractions from GPC measurements (GPC measurement methods are detailed below). FIG. 1 also illustrates such a long high-molecular weight tail for the inventive examples therein (150). This long "high-molecular weight tail" in such unimodal embodiments may contribute to advantageous physical properties. Furthermore, Mz, $M_{z+1}$, and/or Mz/Mn values in accordance with the above-described ranges may be used to quantitatively indicate the presence of this long "high-molecular weight tail."

Polyethylene compositions in accordance with various embodiments can have a g' value (also referred to as g'vis, branching index, or long chain branching (LCB) index) equal to or greater than 0.92, 0.93, or 0.94. For instance, g' may be within the range from 0.90, 0.91, 0.92, 0.93, or 0.94; to 0.95, 0.96, 0.97, 0.98, 0.99, or 1.0 (with ranges from any of the foregoing low ends to any of the foregoing high ends contemplated, such as 0.90 to 0.97, or 0.93 to 0.95).

The distribution and the moments of molecular weight (Mw, Mn, Mz, Mw/Mn, Mz/Mn, etc.), the monomer/comonomer content ($C_2$, $C_4$, $C_6$ and/or $C_8$, and/or others, etc.) and the long chain branching indices (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 µm Mixed-B LS columns are used to provide polymer separation. Detailed analytical principles and methods for molecular weight determinations are described in paragraphs [0044]-[0051] of PCT Publication WO2019/246069A1, which are herein incorporated by reference (noting that the equation c=///referenced in Paragraph [0044] therein for concentration (c) at each point in the chromatogram, is c=β1, where β is mass constant and I is the baseline-subtracted IR5 broadband signal intensity (I)). Unless specifically mentioned, all the molecular weight moments used or mentioned in the present disclosure are determined according to the conventional molecular weight (IR molecular weight) determination methods (e.g., as referenced in Paragraphs [0044]-[0045] of the just-noted publication), noting that for the equation in such Paragraph [0044], a=0.695 and K=0.000579(1-0.75 Wt) are used, where Wt is the weight fraction for hexane comonomer, and further noting that comonomer composition is determined by the ratio of the IR5 detector intensity corresponding to $CH_2$ and $CH_3$ channel calibrated with a series of PE and PP homo/copolymer standards whose nominal values are predetermined by NMR or FTIR (providing methyls per 1000 total carbons ($CH_3$/1000 TC)) as noted in Paragraph 100451 of the just-noted PCT publication).

On the other hand, light scattering (LS) is used to determine branching index $g'_{LCB}$ (also referred to as $g'_{vis}$), in accordance with the methods described in Paragraphs [0048]-[0051] of PCT Publication WO2019/246069A1.

Crystallinity

Furthermore, the polyethylene compositions of various embodiments exhibit at least two distinct crystalline fractions as determined by temperature rising elution fractionation (TREF) with an IR detector. Temperature Rising Elution Fractionation (TREF) analysis for purposes of numbers reported herein was done using a Crystallization Elution Fractionation (CEF) instrument from Polymer Char, S.A., Valencia, Spain. The principles of CEF analysis and a general description of the particular apparatus used are given in the article Monrabal, B. et al., Crystallization Elution Fractionation: A New Separation Process for Polyolefin Resins, *Macromol. Symp.* 2007, 257, 71. In particular, a process conforming to the "TREF separation process" shown in FIG. 1a of the Monrabal article, in which $F_c$=0, was used. Pertinent details of the analysis method and features of the apparatus used are as follows. The solvent used for preparing the sample solution and for elution was 1,2-Dichlorobenzene (ODCB) filtered using a 0.1-μm Teflon filter (Millipore). The sample (16 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 μm), which is back-flushed after every filtration. The filtrate was then used to completely fill a 200-μl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer. The TREF curve was further processed as follows.

The solvent-only response of the instrument was generated and subtracted from the TREF curve of the sample. The solvent-only response is generated by running, typically before, the same method as used for the polymer sample, but without any polymer added to the sample vial; using the same solvent reservoir as for the polymer sample and without replenishing with fresh solvent; and within a reasonable proximity of time from the run for the polymer sample.

The temperature axis of the TREF curve was appropriately shifted to correct for the delay in the IR signal caused by the column-to-detector volume. This volume is obtained by first filling the injection-valve loop with a ~1 mg/ml solution of an HDPE resin or any other resin or substance that can be detected using the narrow band filters of the IR5 detector (said filters tuned to the $CH_2$ and $CH_3$ stretch modes), including, e.g., icosane ($C_{20}$ normal alkane), then loading the loop volume in the same location within the column where a sample is loaded for TREF analysis; then directly flowing, at a constant flow rate of 1 ml/min, the hot solution towards the detector using an isothermal method; and then measuring the time after injection for the HDPE (or other substance per just-given description) probe's peak to appear in the IR signal. The delay volume (ml) is therefore equated to the time (min). This standard calibration procedure may also be found in the Polymer Char manual for the CEF instrument.

The curve was baseline corrected and appropriate integration limits were selected (see below for upper and lower temperature bounds of integration limits), and the curve was normalized so that the area of the curve is 100 wt % (after selecting integration limits such that preferred wt % s of the polymer sample, e.g., at least 95%, 96%, 97%, 98%, or even 99%, are captured by the integration, again as discussed below).

Figure 2A:
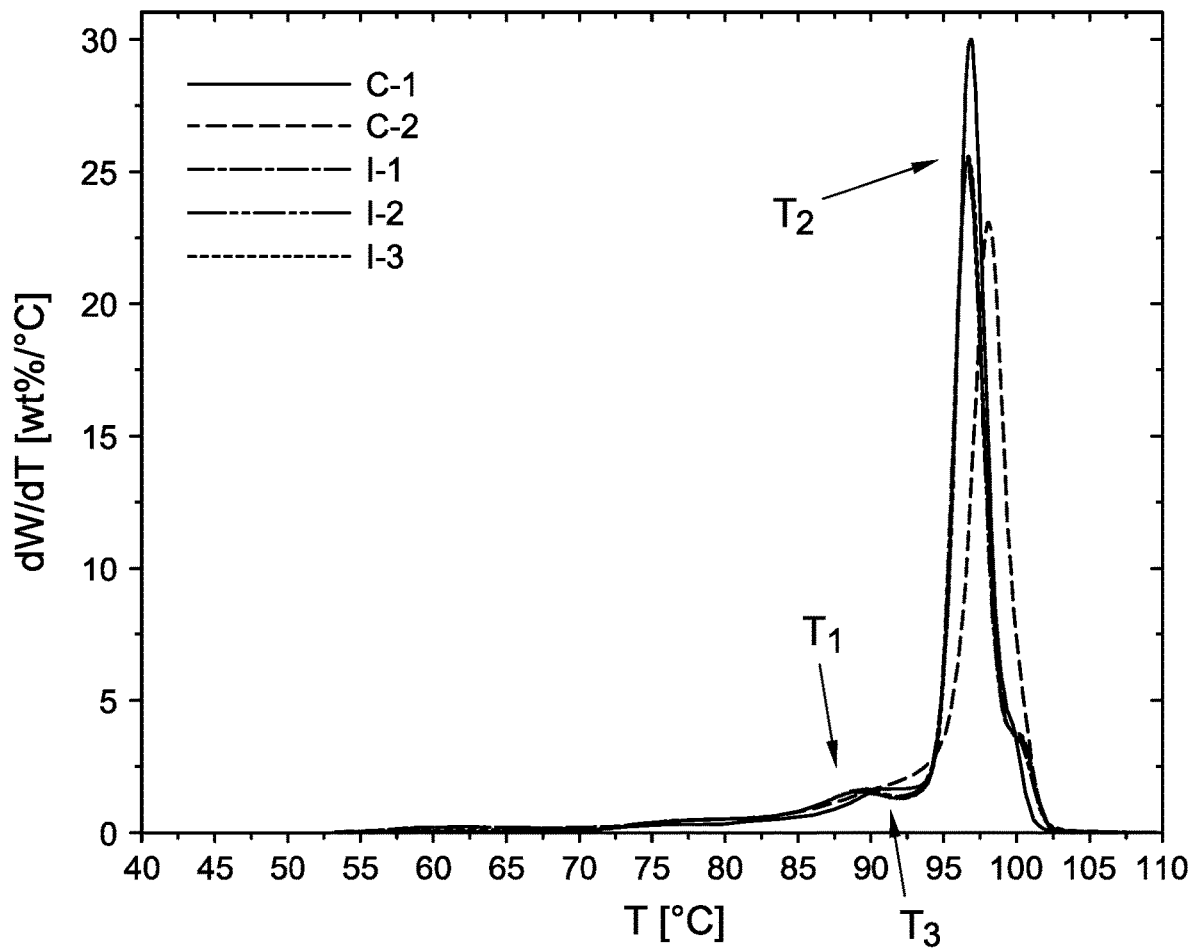
FIGS. 2a and 2b are charts illustrating temperature rising elution fractionation for polyethylene compositions in accordance with various embodiments of the present disclosure as well as comparative resins.
Figure 2B:
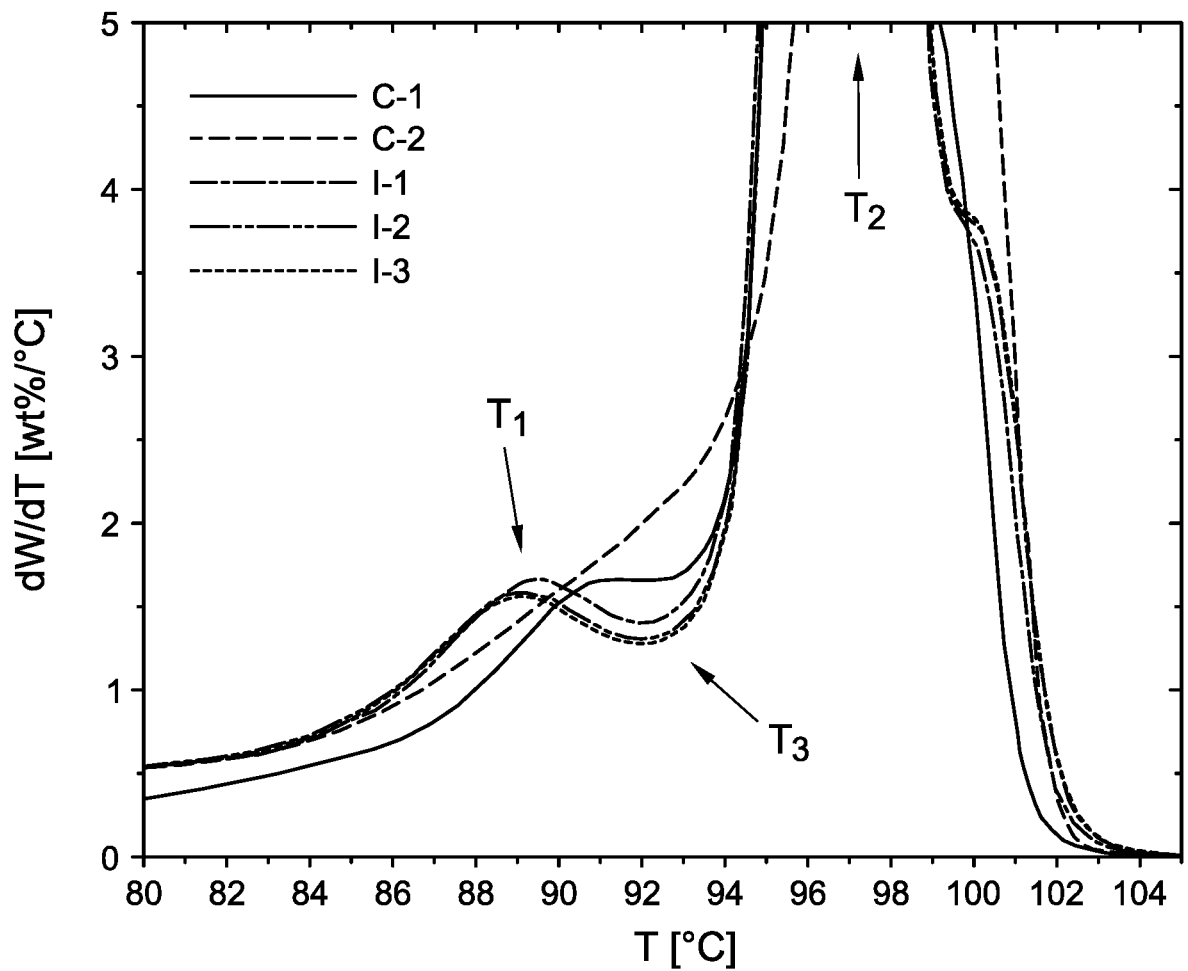

The present polyethylene compositions of various embodiments exhibit 2 or more well-defined peaks in the TREF curve, where there is a valley between the peaks and the peaks can be separated (or deconvoluted). For example, FIGS. 2a and 2b illustrate a comparison between present inventive examples I-1, I-2, and I-3, versus comparative HDPEs (C-1, with unimodal molecular weight distribution; and C-2, a typical bimodal molecular weight HDPE). FIG. 2a is a plot of wt % of polymer (y-axis) eluting at different temperatures (x-axis) when the TREF procedure described above is followed. FIG. 2b is a section of the plot of 2a, zoomed in at the first peak exhibited by the inventive polymer samples. In particular, as can be seen, the present inventive examples have elution of a clear peak at approx. 89° C. with a nearby valley at approx. 92° C., in addition to the clear (and higher) peak at approx. 97° C. (exhibited by both the inventive and comparative examples); while the C-2 (bimodal molecular weight) HDPE exhibits a shoulder with no decrease of eluted wt % as the TREF procedure proceeds upward from 89° C., and the C-1 (unimodal molecular weight) HDPE exhibits a plateau (with arguably very minor decrease) at 91-94° C. Put in mathematical terms, the inventive examples demonstrate three inversions of the second derivative of dW/dT vs. temperature (° C.) in the TREF plot—specifically, two inversions from positive to negative (peaks) at approx. T=T1=89° C. and approx. T=T2=97° C., and one inversion from negative to positive (valley) at approx. T=T3=92° C. Further, the magnitude of change (of dW/dT, or Y-axis value in FIG. 2b) from the first peak (at T=T1) to the valley (T=T3) is between approx. 0.25 to 0.5 wt %/° C., and in particular between about 0.3 to 0.4-wt %/° C., with reference to FIG. 2b.

Polyethylene compositions in accordance with various embodiments can further be defined in terms of the area under various sections of the dW/dT (derivative of eluting wt % with respect to temperature) vs. temperature function created through TREF plotting. With reference again to FIGS. 2a and 2b, the curve can be divided into areas associated with lower-temperature-eluting crystallinity fractions (lower crystallinity) and higher crystallinity fractions by using the distinct valley between the peaks at x=T3 (in these embodiments, approx. 92° C. as noted) as the dividing point. That is, the TREF curve itself can be considered to be composed generally of two portions with respect to area under such curve: the portion or area A1 as the x (temperature) value ranges from x=40° C. to x=T3 (in the case of FIGS. 2a and 2b, T3=92° C.); and the portion or area A2 as the x value ranges from x=T3 (92° C. in FIGS. 2a and 2b) to x=120° C. In other words, A1 is the area under the curve associated with the first, lower-crystallinity fraction or fractions of the polyethylene composition (i.e., associated with the $1^{st}$ peak at T1) and other portions of the composition that elute at temperatures lower than T1; while A2 is the area under the curve associated with the second, higher-crystallinity fraction of the polyethylene composition; using the valley between the two major peaks (T3, which also may be labeled the peak minimum temperature between T1 and T2) as the dividing line.

It should be noted that the upper and lower bounds of temperature used for defining A1 and A2 (40° C. and 120° C., respectively) are selected to ensure adequate coverage of the total area under the TREF curve, preferably at least 95% of the total area. In other embodiments it is envisioned that other extreme low-end and high-end temperature could be used. However, a low temperature below the first notable elution (y value in the TREF curve of 1 or more) should be used (e.g., per FIG. 2a, any temperature below 50° C. could in theory be used, although it is preferred to define a minimum temperature well below (e.g., at least 10° C. below) the first notable elution). Likewise, a high temperature above the final notable elution on the TREF curve should be used (e.g., at least 105° C. per FIG. 2b), but, again, at least 10° C. above the last notable elution is preferred. In the exemplified case, choosing the low T=40° C. and high T=120° C. for the bounds of the total integration, 98% of the area under the total curve was covered. Therefore, put in other words, it is preferred in some embodiments that the upper and lower bounds of integration of TREF curve to determine total area (for purposes of A1 and A2 fractions) are such that one covers at least 95%, preferably at least 96%, more preferably at least 97%, such as at least 98%, or even 99% of the total area under the TREF curve (before normalization to 100 wt %, as discussed above in connection with the TREF procedure).

In addition, to further ensure a properly strong valley is identified between the two crystallinity peaks, the following conditions are preferably also met in polyethylene compositions having crystallinity in accordance with various embodiments herein: T3−T1>1° C. and T2−T1>5.5° C. Put in other words, a distinct valley can be considered to be present on TREF curves for purposes of these embodiments when the distinct valley is observed more than 1° C. higher than the first peak (at x=T1); and furthermore the difference in elution temperature between the two crystallinity peaks (at x=T1 and x=T2) is greater than 5.5° C. In these circumstances, one can be confident that two distinct crystallinity peaks are present, with a distinct valley.

It is furthermore to be noted that T1, T2, and T3 are not necessarily exactly as in the embodiments exemplified herein. For instance, in various embodiments, T1 may be within the range from a low of 80, 81 82, 84, 85, 86, 87, 88, or 89° C., to a high of 90, 91, 92, 93, or 94° C.; T3 may be within the range from a low of 82, 83, 84, 85 86, 87, 88, 89, 90, 91, or 92° C., to a high of 92, 93, 94, 95, or 96° C.; and T2 may be within the range from a low of 92, 93, 94, 95, or 96° C., to a high of 96° C., 97° C., 98° C., 99° C., or 100° C., with ranges from any low end to any high end contemplated (provided the high is greater than the low). For instance, T1 may generally be within the range from 80-94° C.; T3 may be within the range from 82-96° C.; and T2 may be within the range from 92-100° C. Further, in various of these embodiments, T1, T2, and T3 preferably follow the just-noted conditions (T3−T1>1° C.; T2−T1>5.5° C.).

Following these definitions of TREF curve area, a polyethylene composition in accordance with various embodiments of the present disclosure exhibits area A1 that is 15% or more of the total area under the entire curve (i.e., A1 plus A2, or the area under the curve as x varies from T=40° C. to T=120° C.); and area A2 that is at most 85% of the total area under the curve. In various embodiments, A1 may be at least 15.5, 16.0, 16.5, 17.0, 17.5, 18.0, 18.5, 19.0, 19.5, 20.0%, 24.0%, 25.0%, 27%, or even 30.0% of the total area (A1 plus A2) under the curve, with A2 constituting the balance of this area %. This helps quantify the deconvolution between the first and second distinct fractions of crystallinity in the polyethylene compositions of such embodiments. Without wishing to be bound by theory, it is believed that the presence of the additional distinct fraction of crystalline polymer within the polyethylene composition provides some of the advantageous properties approaching or even matching those of polyethylene compositions having multimodal molecular weight distribution.

Other Rheological Properties

In various embodiments, the polyethylene compositions have melt index, (MI, also referred to as $I_2$ or $I_{2.16}$ in recognition of the 2.16 kg loading used in the test) within the range from 0.1 g/10 min to 5 g/10 min, such as from a low of any one of 0.1, 0.2, and 0.3 g/10 min, to a high of 0.5, 0.55, 0.60, 0.65, 0.70, 0.75, 1.0, 1.2, 1.5, 1.7, 2.0, 3.0, 4.0, 5.0, or 10.0 g/10 min, with ranges from any of the foregoing low ends to any of the foregoing high ends contemplated herein) (e.g., 0.1 to 1.0 or 2.0 g/10 min, such as 0.3 to 0.5 g/10 min). Moreover, polyethylene compositions of various embodiments can have a high load melt index (HLMI) (also referred to as I21 or I21.6 in recognition of the 21.6 kg loading used in the test) within the range from a low of 20, 25, 28, 29, 30, or 31 g/10 min to a high of 35, 36, 37, 38, 39, 40, 45, 50, 60, 70, or 75 g/10 min; with ranges from any of the foregoing lows to any of the foregoing highs contemplated herein (e.g., 25 to 50 g/10 min, such as 30 to 40 g/10 min).

Polyethylene compositions according to various embodiments may have a melt index ratio (MIR, defined as $I_{21.6}/I_{2.16}$) within the range from a low of any one of 60, 65, 70, 75, 80, 81, 82, 83, 84, or 85 to a high of 88, 89, 90, 91, 92, 93, 94, 95, 100, or 110; with ranges from any of the foregoing lows to any of the foregoing highs contemplated herein (e.g., 60 to 100, such as 80 or 85 to 94 or 95).

Melt index (2.16 kg) and high-load melt index (HLMI, 21.6 kg) values can be determined according to ASTM D1238-13 procedure B, such as by using a Gottfert MI-2 series melt flow indexer. For MI, HLMI, and MIR values reported herein, testing conditions were set at 190° C. and 2.16 kg (MI) and 21.6 kg (HMLI) load. An amount of 5 g to 6 g of sample was loaded into the barrel of the instrument at 190° C. and manually compressed. Afterwards, the material was automatically compacted into the barrel by lowering all available weights onto the piston to remove all air bubbles. Data acquisition was started after a 6 min pre-melting time. Also, the sample was pressed through a die of 8 mm length and 2.095 mm diameter.

In various embodiments, the polyethylene composition exhibits shear-thinning rheology, meaning that for increasing shear rates, viscosity decreases. But, advantageously, even at low shear rates (less than 1 rad/s, preferably less than 0.5 rad/s, such as at 0.1 and 0.01 rad/s), the complex viscosity of the polyethylene compositions of such embodiments is relatively low. This rheology indicates good processability for the polyethylene compositions in accordance with such embodiments (insofar as the shear rates simulate the viscosity that the composition may exhibit when processed in extruders or similar equipment). Accordingly, a polyethylene composition according to various embodiments may exhibit one or more, preferably two or more, or even all, of the following theological properties:

Degree of shear thinning, DST, within the range from a low of 0.965, 0.970, or 0.975 to a high of 0.980, 0.985, or 0.990, with ranges from any foregoing low to any foregoing high contemplated herein (e.g., 0.975 to 0.980). DST is a measure of shear-thinning rheological behavior (decreasing viscosity with increasing shear rate), defined as DST=[η*(0.01 rad/s)−η*(100 rad/s)]/η*(0.01 rad/s), where q*(0.01 rad/s) and q*(100 rad/s) are the complex viscosities at 0.01 and 100 rad/s, respectively.

Complex viscosity (at 628 rad/s, 190° C.) of 800, 700, 600, 500, or 450 Pa*s or less; such as within the range from a low of 200, 250, 300, 350, 400, 450, 500, or 550 Pa*s to a high of 300, 350, 400, 450, 500, 550, 600, 650, 700, 750, or 800 Pa*s, with ranges from any of the foregoing low ends to any of the foregoing high ends contemplated in various embodiments (provided the high end is greater than the low end) (e.g., 200 to 800 Pa*s, such as 300 to 500 Pa*s).

Complex viscosity (at 100 rad/s, 190° C.) of 3,000 Pa*s or less; such as 2,000; 1,900; 1,800; or 1,500 Pa*s or less; such as within the range from a low of 900; 1,000; 1,200; 1,300; or 1,350 to a high of 1,300; 1,400; 1,500; 1.750; 2,000; 2,250; 2,500; 2,750; or 3,000 Pa*s, with ranges from any low end to any high end contemplated herein (provided the high end is greater than the low end) (e.g., 900 to 3,000 Pa*s, such as 1,200 to 1,500 Pa*s).

Complex viscosity (at 0.01 rad/s, 190° C.) of 100,000 Pa*s or less; such as 80,000 Pa*s or less; or 75,000 Pa*s or less; or 65,000 Pa*s or less; or in some cases within the range from a low of 10,000; 15,000; 20,000; 30,000; 45,000; 50,000; or 55,000 Pa*s to a high of 60,000; 65,000; 70,000; 75,000; 80,000; 85,000; 90,000; 95,000; or 100,000 Pa*s, with ranges from any low end to any high end contemplated herein (provided the high end is greater than the low end) (e.g., 10,000 to 100,000 Pa*s, such as 50,000 to 75,000 Pa*s).

In particular embodiments, the polyethylene composition may be characterized by a combination of rheological and microstructural parameters according to the following relationship:

$$\frac{M_z HLMI}{M_n \eta_{low}}$$

where HLMI (or, equivalently, $I_{21.6}$). Mz, and Mn are as defined previously, and $\eta_{now}$ is the complex viscosity at 628 rad/s. This relationship may be referred to herein as the "high-low ratio" because it provides a ratio of high-molecular weight polymer chain population to low-molecular weight polymer chain population in the polyethylene composition, also accounting for low viscosity rheological behavior. High-low ratio of various polyethylene compositions in accordance with the present disclosure may be within the range from a low of any one of 8, 9, 10, 10.5, 11, 11.5, or 12.0 to a high of any one of 14, 14.5, 15.0, 15.5, 16.0, 16.5, 17, 18, 19, or 20, with ranges from any of the foregoing lows to any of the foregoing highs contemplated herein (e.g., 8 to 20, 10 to 20, 10 to 16, 10 to 15.5, etc.).

Rheological data such as complex viscosity was determined using SAOS (small amplitude oscillatory shear) testing. SAOS experiments was performed at 190° C. using a 25 mm parallel plate configuration on an ARES-G2 (TA Instruments). Sample test disks (25 mm diameter, 2 mm thickness) were made with a Carver Laboratory press at 190° C. Samples were allowed to sit without pressure for approximately 3 minutes in order to melt and then held under pressure typically for 3 minutes to compression mold the sample. The disk sample was first equilibrated at 190° C. for about 10 minutes between the parallel plates in the rheometer to erase any prior thermal and crystallization history. An angular frequency sweep was next performed with a typical measurement gap of 1.5 mm from 628 rad/s to 0.01 rad/s angular frequency using 5 points/decade and a strain value within the linear viscoelastic region determined from strain sweep experiments (see C. W. Macosko, Rheology Principles, Measurements and Applications. Wiley-VCH, New York, 1994). All experiments were performed in a nitrogen atmosphere to minimize any degradation of the sample during the rheological testing.

In order to quantify the shear thinning rheological behavior, which is defined as the decrease of the viscosity at the increase of frequency or shear rate, we defined the degree of shear thinning (DST) parameter. The DST was measured by the following expression:

$$DST=[\eta*(0.01\ rad/s)-\eta*(100\ rad/s)]/\eta*(0.01\ rad/s)$$

where η*(0.01 rad/s) and η*(100 rad/s) are the complex viscosities at 0.01 and 100 rad/s, respectively. Complex viscosities values are shown merely to highlight that the inventive resins show lower viscosities values at 0.01 rad/s than the controls but all resins have basically the same DST and comparable viscosities at 628 rad/s.

Other Physical Properties

Polyethylene compositions in accordance with particular embodiments exhibit highly advantaged Environmental Stress Crack Resistance (ESCR), particularly for a composition exhibiting unimodal molecular weight. It is believed ESCR of these unimodal compositions can surprisingly approach or perhaps in some cases even surpass ESCR achieved with bimodal polyethylene grades. ESCR is determined at either 10% or 100% Igepal (octylphenoxy-polyethoxy-ethanol, a nonionic, non-denaturing detergent used as a stress crack accelerant), in accordance with ASTM D1693, Cond. B.

Polyethylene compositions of various embodiments exhibit ESCR (10% Igepal) within the range from a low of 45, 46, 47, 48, 49, 50, 51, 52, 53, 54, or 55 hours, to a high of any one of 60, 61, 62, 63, 64, 65, 66, 67, 68, 69, 70, 75, or 80 hours, with ranges from any of the foregoing lows to any of the foregoing highs contemplated (e.g., 45 to 75 hours, such as 50 to 70 hours or 50 to 65 hours). Also or instead, polyethylene compositions may exhibit ESCR (100% Igepal) within the range from a low of 50, 60 70, 80, 85, 90, 95, or 100 hours, to a high of 130, 135, 140, 145, 150, 155, 160, 165, 170, 175, 180, 185, 190, 195, 200, 225, or 250 hours, with ranges from any of the foregoing lows to any of the foregoing highs contemplated (e.g., 80 to 250 hours, such as 80 to 175 hours or 85 to 150 hours).

The polyethylene compositions of various embodiments may also or instead exhibit one or more, two or more, or even all of the following impact properties:

Izod Impact strength (23° C., ASTM D256 Method A) within the range from a low of 1.2, 1.5, 1.6, 1.7, or 1.8 Ft-lb/in to a high of 2.0, 2.2, 2.3, 2.4, 2.5, 2.7, 2.8, 2.9, or 3.0 Ft-lb/in, with ranges from any of the foregoing lows to any of the foregoing highs contemplated (e.g., 1.2 to 3.0 Ft-lb/in, such as 1.8 to 2.5 or 1.8 to 2.4 Ft-lb/in).

Izod Impact strength (−40° C., ASTM D256 Method A) within the range from a low of 1.00, 1.01, 1.02, 1.03, 1.04, or 1.05 Ft-lb/in to a high of 1.10, 1.11, 1.12, 1.13, 1.14, 1.15, or 1.20 Ft-lb/in, with ranges from any of the foregoing lows to any of the foregoing highs contemplated (e.g., 1.00 to 1.20 Ft-lb/in, such as 1.00 to 1.15 or 1.00 to 1.10 Ft-lb/in).

Charpy Impact Strength, also known as Charpy V-notch test (ISO 179_1/1 eA) within the range from a low of 6, 7, 7.1, 7.2, 7.5, 7.7, 7.8, 8.0, 9.2, 8.4, or 8.5 KJ/m$^2$ to a high of 9.0, 9.1, 9.2, 9.5, 9.8, 10.0, or 10.5 KJ/m$^2$, with ranges from any of the foregoing lows to any of the foregoing highs contemplated (e.g., 7 to 10.5, such as 7.1 or 7.2 to 9.5 or 10.0 KJ/m$^2$). Charpy Impact Strength is a standardized high strain-rate test which determines the amount of energy absorbed by a material during fracture. The quantitative result of the impact tests the energy needed to fracture a material and can be used to measure the toughness of the material. It can be determined per the aforementioned ISO method using equipment from Empire Technologies Inc.

The polyethylene compositions of various embodiments may also or instead exhibit one or more, two or more, or even all of the following additional physical properties:

Notched Constant Ligament Stress (NCLS) (per ASTM F2136; 10% Igepal, 50° C., 600 psi; with the sheet prepared by compressional molding per ASTM D4703) within the range from a low of 10, 11, 12, 13, or 14 hours, to a high of 14, 15, 16, 17, 18, 19, 20, 22, 24, or 25 hours, with ranges from any of the foregoing lows to any of the foregoing highs contemplated (e.g., 10 to 20, such as 13 to 20 or 13 to 18).

Shore D hardness (ASTM D2240) within the range from a low of 55, 60, 61, or 62 to a high of 62, 63, 64, 65, 66, 68, or 70, with ranges from any of the foregoing lows to any of the foregoing highs contemplated (e.g., 55 to 70, such as 60 to 65 or 60 to 62).

Vicat softening temperature (ASTM D1525, ION at 50° C./hr) within the range from a low of 115, 118, 120, 121, 122, 123, 124.0, 124.1, 124.2, or 124.3° C. to a high of 124.8, 124.9, 125.0, 125.1, 125.4, 125.5, 125.6, 126.0, 127.0, 130.0, or 135.0° C., with ranges from any of the foregoing lows to any of the foregoing highs contemplated (e.g., 124.0 to 130.0° C., such as 124.0 to 126.0° C., or 124.0 to 124.8° C.).

Tensile stress at yield (ASTM D638 using type IV tensile bar compression molded per ASTM D4703 and die cut; testing speed is 2 in/min) within the range from a low of 3800, 3900, 3950, 3990, 4000, 4020, or 4030 psi to a high of 4050, 4070, 4080, 4090, 4100, or 4150 psi, with ranges from any of the foregoing lows to any of the foregoing highs contemplated (e.g., 3800 to 4150, such as 3990 to 4050). Tensile Stress at yield point is the first point on the stress-strain curve at which an increase in strain occurs without an increase in stress.

Flexural 1% secant modulus within the range from a low of 140, 150, 160, 165, 170, or 180 in/min to a high of 190, 195, 200, 205, 210, 215, or 220 in/min, with ranges from any of the foregoing lows to any of the foregoing highs contemplated (e.g., 150 to 220 in/min, such as 165 to 200 in/min, or 170 to 200 in/min). The flexural properties of the polymer can be obtained by following ASTM D790, Proc. B. The secant modulus is the ratio of stress to corresponding strain at any selected point on the stress-strain curve, that is, the slope of the straight line that joins the origin and a selected point on the actual stress-strain curve. The 1% secant modulus is calculated at 1% tensile strain using the formula: Secant Modulus=$(\sigma 2-\sigma 1)/(\varepsilon 2-\varepsilon 1)$= (Stress @ 1% Strain−0)/(1% Strain−0), noting that flexural stress a and flexural strain s are per ASTM D790-17.

Methods of Making Polyethylene Compositions

Polymerization processes of the present disclosure may be carried out in any suitable manner known in the art. Any suspension, homogeneous, bulk, solution, slurry, or gas phase polymerization process known in the art may be used. Such processes can be run in a batch, semi-batch, or continuous mode. A homogeneous polymerization process is defined to be a process where at least about 90 wt % of the product is soluble in the reaction medium. A bulk process is defined to be a process where monomer concentration in all feeds to the reactor is 70 volume % or more. Alternately, no solvent or diluent is present or added in the reaction medium, (except for the small amounts used as the carrier for the catalyst system or other additives, or amounts typically found with the monomer; e.g., propane in propylene).

In particular embodiments, the process is a slurry polymerization process, preferably a continuous slurry loop polymerization reaction process. A single slurry loop reactor may be used, or multiple reactors in parallel or series (although, to achieve the unimodal molecular weight distribution in accordance with various embodiments, as discussed previously, it is preferable that either a single reactor is used, or that the same catalyst, feed, and reaction conditions are used in multiple reactors, e.g., in parallel, such that the composition is considered made in a single reactive step). As used herein, the term "slurry polymerization process" means a polymerization process in which a supported catalyst is used and monomers are polymerized on the supported catalyst particles within a liquid medium (comprising, e.g., inert diluent and unreacted polymerizable monomers), such that a two phase composition including polymer solids and the liquid circulate within the polymerization reactor. Typically, a slurried tank or slurry loop reactor may be used; in particular embodiments herein, a slurry loop reactor is preferred. In such processes the reaction diluent, dissolved monomers, and catalyst are circulated in a loop reactor in which the pressure of the polymerization reaction is relatively high. The produced solid polymer is also circulated in the reactor. A slurry of polymer and the liquid medium may be collected in one or more settling legs of the slurry loop reactor from which the slurry is periodically discharged to a flash chamber wherein the mixture is flashed to a comparatively low pressure; as an alternative to settling legs, in other examples, a single point discharge method may be used to move the slurry to the flash chamber. The flashing results in substantially complete removal of the liquid medium from the polymer, and the vaporized polymerization diluent (e.g., isobutane) is then recompressed in order to condense the recovered diluent to a liquid form suitable for recycling as liquid diluent to the polymerization zone. The cost of compression equipment and the utilities required for its operation often amounts to a significant portion of the expense involved in producing polymer.

Slurry polymerization processes suitable for achieving such embodiments are described in, e.g., U.S. Pat. No. 6,204,344, col. 8, line 30 to col. 9, line 48 & FIG. 1, which portions are incorporated by reference herein; the entirety of the '344 patent is incorporated by reference herein in jurisdictions where such incorporation is permitted. More generally, the '344 patent describes an embodiment of a slurry polymerization system that includes a two-stage flash system for diluent recovery and recycling and associated methods for diluent recovery and recycling. The '344 patent discloses, inter alia, an apparatus for continuously recovering polymer solids from a polymerization effluent comprising a slurry of said polymer solids in a liquid medium comprising an inert diluent and unreacted monomers, which apparatus may be employed in embodiments in accordance with the present disclosure (although other slurry polymerization systems and apparatus may just as well be employed in accordance with various other embodiments). The apparatus described in the '344 patent comprises a discharge valve on a slurry reactor, examples of which include slurry loop reactors and stirred tank slurry reactors, for the continuous discharge of a portion of the slurry reactor contents into a first flash tank. The first flash tank operates at a pressure and slurry temperature such that a substantial portion of the liquid medium will be vaporized and the inert diluent component of said vapor condensable, without compression, by heat exchange with a fluid. The first flash tank is in fluid communication with a second flash tank via a pressure seal that allows plug flow of a concentrated slurry into a second flash tank that operates at a temperature of the concentrated polymer solids/slurry and pressure such that any remaining inert diluent and/or unreacted monomer will be vaporized and removed overhead for condensation by compression and heat exchange and the polymer solids are discharged from the bottom of said second flash tank for additional processing or storage. A complete polymer production plant will include a number of these and other components (e.g., components for handling solids, liquids and gases, such as but not limited to separator systems such as cyclones and accumulator drums; pumps; sensors or meters of flow, pressure, and/or temperature; and the like), which are not described in detail herein. Unless otherwise described herein, such components are considered to be known in the art.

The liquid diluent employed in the polymerization medium is typically an alkane having from 3 to 7 carbon atoms. The medium employed should be liquid under the conditions of polymerization and relatively inert. In some embodiments, a branched alkane is a preferred diluent. In further embodiments, a hexane or an isobutane diluent is employed. More generally, suitable diluents/solvents for polymerization include non-coordinating, inert liquids. Non-limiting examples generally include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4 to C10 alkanes, chlorobenzene, and aromatic and alkylsubstituted aromatic compounds, such as benzene, toluene, mesitylene, and xylene. Suitable solvents also include liquid olefins which may act as monomers or comonomers including, but not limited to, ethylene, propylene, 1-butene, 1-hexene, 1-pentene, 3-methyl-1-pentene, 4-methyl-1-pentene, 1-octene, 1-decene, and mixtures thereof. In some preferred embodiments, aliphatic hydrocarbon solvents are used as the solvent, such as isobutane, butane, pentane, isopentane, hexane, isohexane, heptane, octane, dodecane, or mixtures thereof; cyclic and alicyclic hydrocarbons, such as cyclohexane, cycloheptane, methylcyclohexane, methylcycloheptane, or mixtures thereof.

Preferred polymerization processes may be run at any temperature and/or pressure suitable to obtain the desired polyolefins. In particular embodiments, the polyethylene compositions are produced in a slurry reactor (e.g., slurry tank or slurry loop, preferably slurry loop) maintained at temperatures within the range from 80 to 110° C., such as 82 to 108° C., 95 to 105° C. or 100 to 105° C.; or 95 to 110° C. Reactor pressure may be within the range from 425 to 800 psig (2930 to 5516 kPa), such as from 450 to 650 psig (3102 to 4481 kPa); or 500 to 600 psig (3447 to 4137 kPa).

Hydrogen may be added to a reactor for molecular weight control of polyolefins. In at least one embodiment, hydrogen is fed to the polymerization reactor such that it is present in the reactor at a molar concentration within the range from about 0.1 to 2.1 mol %, such as 0.1 to 1.0 mol %.

In another class of embodiments, the polymerization processes are gas phase polymerization processes. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Typically, the gas phase reactor may operate in condensing mode where one or more of the diluents/solvents, as described above, act as an inert condensing agent (ICA) in the fluidized bed reactor for the removal of heat to increase production rates and/or modify polymer properties. See, for example, U.S. Pat. Nos. 4,543, 399; 4,588,790; 5.028,670; 5,317,036; 5,352,749; 5,405, 922; 5,436,304; 5,453,471; 5,462,999; 5,616,661; and 5,668,228.

Catalysts

As noted, suitable polymerization processes employ a polymerization catalyst. The catalyst, for example, would preferably include chromium, chromium-containing, or chromium-based catalysts. Chromium, chromium-containing, or chromium-based catalysts are well-known and find utility for the polymerization of polyolefin polymers. Examples of two widely used catalysts include chromium oxide ($CrO_3$) and silylchromate catalysts, optionally, with at least one support. Chromium-containing catalysts have been the subject of much development in the area of continuous fluidized-bed gas-phase and slurry polymerization for the production of polyethylene polymers. Such catalysts and polymerization processes have been described, for example, in U.S. Patent Application Publication No. 2011/0010938 and U.S. Pat. Nos. 2,825,721, 7,915,357, 8,129,484, 7,202, 313, 6,833,417, 6,841,630, 6,989,344, 7,504,463, 7,563,851, 8,420,754, and 8,101,691.

Typically, the catalyst system includes a supported chromium catalyst and a cocatalyst or activator. In general, one such catalyst includes a chromium compound supported on an inorganic oxide matrix. Typical supports include silicon, aluminum, zirconium and thorium oxides, as well as combinations thereof. Various grades of silica and alumina support materials are widely available from numerous commercial sources.

In a particular embodiment, the support is silica. Suitable silica generally has a good balance of a high surface area and large particle size. These silicas are typically in the form of spherical particles obtainable by a spray-drying process, or in the form of granular particles by a milling method, and have a surface area of about at least 300 m$^2$/g and an average particle size at least 25 microns. Methods for measuring surface area, pore volume, and average particle size are disclosed in WO 2011/161412. For production of higher molecular weight HDPE, higher surface areas of about 500-600 m$^2$/g are typically used along with modification with Al or Ti.

In several classes of embodiments, the silica support is rigid and has a large particles size at an average of about 90-110 microns and a high surface area extending up to at least 800 m$^2$/g. See, for example, WO 2011/161412. Without being bound to theory, the high surface area promotes the formation of a high molecular weight component that provides improved physical polymer properties, especially stress crack resistance for high load melt index products such as HDPE drums and intermediate bulk containers (IBC's). It also allows for the use of low levels of Al or Ti modification of the Cr/silica activated catalyst.

Commercially available silica supports include but are not limited to the support for the PQ PD-11050 catalyst (880 m$^2$/g surface area and 1.87 mL/g pore volume); the support for the PD-13070 catalyst (872 m$^2$/g surface area and 2.03 mL/g pore volume) available from the PQ Corporation, Malvern, Pennsylvania Previously, PQ silicas were limited to surface areas at around or below 650 m$^2$/g such as their ES 70, CS2133 and CS2050, MS3065 silicas. Alternately, Sylopol 952, 955, 2408 and others are available from Grace Specialty Catalysts, W.R. Grace & Co., Columbia, Maryland.

In another embodiment, the support is a silica-titania support. Silica-titania supports are well known in the art and are described, for example, in U.S. Pat. No. 3,887,494. Silica-titania supports can also be produced as described in U.S. Pat. Nos. 3,887,494, 5,096,868 and 6,174,981 by "cogelling" or coprecipitating silica and a titanium compound.

Suitable chromium-based catalysts, and in particular titanium-modified chromium-based catalysts, are described. e.g., in Paragraphs 100191-100211 of U.S. Patent Publication No. 2020/0055966, which description is incorporated herein by reference.

In a class of embodiments, the chromium-based catalyst may optionally be used with at least one cocatalyst or activator. In general, the cocatalyst may be a metal alkyl of a Group 13 metal. The cocatalyst can be a compound of formula MR$_3$, where M is a group 13 metal (in accordance with the new numbering scheme of the IUPAC), and each R is independently a linear or branched $C_1$ or $C_2$ or $C_4$ to $C_{12}$ or $C_{10}$ or $C_8$ alkyl group. Mixtures of two or more such metal alkyls are also contemplated, and are included within the term "cocatalyst" as used herein. In various embodiments, M may be aluminum, and the cocatalyst is at least one aluminum alkyl. Aluminum alkyls include triethyl aluminum (TEAl), tri-isobutylaluminum (TIBAl), tri-n-hexyl aluminum (TNHA), tri-n-octylaluminum (TNOA), and mixtures thereof. In another class of embodiments, the at least one aluminum alkyl may be an alkyl aluminum alkoxide compound, such as, for example, diethyl aluminum ethoxide (DEAIE). In any of the embodiments described above, the aluminum alkyl may be pre-contacted with the at least one chromium-containing catalyst at an Al/Cr molar ratio of 0.01 to 10.00, at an Al/Cr molar ratio of 0.05 to 10.00, at an Al/Cr molar ratio of 0.05 to 8.00, at an Al/Cr molar ratio of 0.10 to 8.00, at an Al/Cr molar ratio of 0.10 to 5.00, at an Al/Cr molar ratio of 0.50 to 5.00, or at an Al/Cr molar ratio of 1.00 to 3.00.

Blends with PCR and Other Polymer Material

In some particular embodiments, the polyethylene composition produced herein is combined with one or more additional polymer compositions in a blend prior to being formed into a film, molded part, or other article. As used herein, a "blend" may refer to a dry or extruder blend of two or more different polymers, and in-reactor blends, including blends arising from the use of multi or mixed catalyst systems in a single reactor zone, and blends that result from the use of one or more catalysts in one or more reactors under the same or different conditions (e.g., a blend resulting from in series reactors (the same or different) each running under different conditions and/or with different catalysts).

In particular embodiments, additional polymer composition(s) include post-consumer recycled (PCR) polymer materials. Examples include, e.g., homopolymer PCR (milk bottle resin), or mixed density HDPE PCR (e.g., a mixture of multiple sources of recycled PE, potentially having up to 7 wt % polypropylene in the mixture). An example of homopolymer PCR is KWR-101 resin, available from KW Plastics; an example of mixed-density HDPE PCR includes KWR-102 from KW Plastics.

In yet further embodiments, blend partners with the present polyethylene compositions can include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, ethylene propylene diene monomer (EPDM) polymer, block copolymer, styrenic block copolymers, polyamides, polycarbonates. PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In some embodiments, the additional polymer (whether PCR polymer material or otherwise) is present in the above blends, at from 0.1 to 99 wt %, based upon the weight of the polymers in the blend, such as within the range from a low from any one of 0.1, 0.5, 1, 5, 10, 15, 20, 25, 30, 35, 40, 45, or 50 wt %, to a high of 10, 15, 20, 25, 30, 35, 40, 45, 50, 55, 60, 65, 70 or even 75 wt %, with ranges from any of the foregoing low ends to any of the foregoing high ends contemplated herein, provided the high is greater than the low (e.g., 20 to 55 wt %, to 65 wt %, 45 to 55 wt %, 50 to 75 wt %, 50 to 60 wt %, etc.). The balance of the polymer blend of such embodiments may be a polyethylene composition of the various embodiments as described previously (where the "balance" means that wt % additional polymer+ wt % polyethylene composition=100 wt %). In particular embodiments, the additional polymer is PCR polymer material.

The blends described above may be produced by mixing the polyethylene composition with one or more additional polymers (as described above, and specifically including PCR material), by connecting reactors together in series to make reactor blends or by using more than one catalyst in the same reactor to produce multiple species of polymer. The polymers can be mixed together prior to being put into an extruder or may be mixed in an extruder.

The blends may be formed using conventional equipment and processes, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the molding and/or film extruder.

Additionally, additives (e.g., described in more detail below) may be included in the blend, in one or more components of the blend, and/or in a product formed from the blend, such as a film, as desired. Such additives may include, for example: fillers; antioxidants (e.g., hindered phenolics such as IRGANOX™ 1010 or IRGANOX™ 1076 available from Ciba-Geigy); phosphites (e.g., IRGAFOS™ 168 available from BASF); Acid scavenger, anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica fillers; talc; and the like.

In particular embodiments involving a 50/50 blend (that is, a 1:1 ratio by weight) of polyethylene composition and PCR polymer material, the blend may exhibit any one or more of the below properties. Put in other words, the polyethylene compositions in accordance with various embodiments, when blended at a 1:1 weight ratio with PCR material, exhibit one or more of the following properties:

Notched Constant Ligament-Stress (NCLS, 50° C., 600 psi) value of greater than 7, such as greater than 8 hours; e.g., within the range from 8 to 10, 12, or 15 hours. NCLS can be performed by following ASTM F2136, where the sheet is prepared by compressional molding per ASTM D4703.

MI within the range from 0.1 to 1.0, such as 0.3 or 0.4 to 0.5, 0.6, or 0.7 g/10 min.

HLMI within the range from 20, 30, or 40 to 50, 60, or 70 g/10 min.

MIR within the range from 70, 75, 80, 85, 90, or 95 to 100, 105, 110, or 115.

Density within the range from 0.950, 0.951, 0.952, 0.953, 0.954, 0.955, or 0.957 to 0.960, 0.961, 0.962, 0.963, 0.964, or 0.965.

ESCR (100% Igepal) within the range from a low of 25, 30, 32, 35, 36, 37, 38, or 39 hours to a high of 45, 50, 55, or 60 hours.

Flexural 1% secant modulus (ASTM D790, Procedure A) within the range from 135,000 to 160,000 psi; such as 135,000 to 145,000 psi.

Izod impact (ASTM D256. Method A at 23° C.) within the range from 0.90 or 0.94 to 1.2 Ft-lb/in.

Izod impact (ASTM D256, Method A at 18° C.) within the range from 0.70 or 0.75 to 0.85 or 0.95 ft-lb/in.

Shore D hardness within the range from 55 or 60 to 65 or 70.

Additives

A polyethylene composition (and/or a blend comprising the polyethylene composition) of the present disclosure may include one or more additives. The additives may include reinforcing and non-reinforcing fillers, antioxidants, stabilizers, processing oils (or other solvent(s)), compatibilizing agents, lubricants (e.g., oleamide), antiblocking agents, anti-static agents, waxes, coupling agents for the fillers and/or pigment, pigments, flame retardants, or other processing aids, or combination(s) thereof.

A polyethylene composition of the present disclosure can include additives such that the additives (e.g., fillers present in a composition) have an average agglomerate size of less than 50 microns, such as less than 40 microns, such as less than 30 microns, such as less than 20 microns, such as less than 10 microns, such as less than 5 microns, such as less than 1 micron, such as less than 0.5 microns, such as less than 0.1 microns, based on a 1 cm×1 cm cross section of a ring polymer composition as observed using scanning electron microscopy.

In at least one embodiment, a polyethylene composition may include fillers and coloring agents. Exemplary materials include inorganic fillers such as calcium carbonate, clays, silica, talc, titanium dioxide or carbon black. Any suitable type of carbon black can be used, such as channel blacks, furnace blacks, thermal blacks, acetylene black, lamp black and the like.

In at least one embodiment, a polyethylene composition may include flame retardants, such as calcium carbonate, inorganic clays containing water of hydration such as aluminum trihydroxides ("ATH") or magnesium hydroxide.

In at least one embodiment, a polyethylene composition may include UV stabilizers, such as titanium dioxide or Tinuvint XT-850. The UV stabilizers may be introduced into a roofing composition as part of a masterbatch. For example, UV stabilizer may be pre-blended into a masterbatch with a thermoplastic resin, such as polypropylene, or a polyethylene, such as linear low density polyethylene.

Still other additives may include antioxidant and/or thermal stabilizers. In at least one embodiment, processing and/or field thermal stabilizers may include IRGANOX® B-225 and/or IRGANOX® 1010 available from BASF.

In at least one embodiment, a polyethylene composition may include a polymeric processing additive. The processing additive may be a polymeric resin that has a very high melt flow index. These polymeric resins can include both linear and/or branched polymers that can have a melt flow rate that is about 500 dg/min or more, such as about 750 dg/min or more, such as about 1000 dg/min or more, such as about 1200 dg/min or more, such as about 1500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives can include polypropylene homopolymers, and branched polymeric processing additives can include diene-modified polypropylene polymers. Similar processing additives are disclosed in U.S. Pat. No. 6,451,915, which is incorporated herein by reference.

In some embodiments, fillers (such as calcium carbonate, clays, silica, talc, titanium dioxide, carbon black, a nucleating agent, mica, wood flour, and the like, and blends thereof, as well as inorganic and organic nanoscopic fillers) can be present in a polyethylene composition in an amount from about 0.1 wt % to about 10 wt %., such as from about 1 wt % to about 7 wt %, such as from about 2 wt % to about 5 wt %, based on the total weight of the polyethylene composition (or, where applicable, total % weight of the blend). The amount of filler that can be used can depend, at least in part, upon the type of filler and the amount of extender oil that is used.

In some embodiments, and when employed, the polyethylene composition (and/or a blend comprising the polyethylene composition) can include a processing additive (e.g., a polymeric processing additive) in an amount of from about 0.1 wt % to about 20 wt % based on the total weight of the polyethylene composition (or, where applicable, total weight of the blend).

Articles

A polyethylene composition of the present disclosure (and/or a blend comprising the polyethylene composition) can be useful in forming various articles, including film, sheet, and fiber extrusion and co-extrusion; as well as gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Suitable films may include monolayer or multilayer films, and they may furthermore be blown or cast films formed by co-extrusion or by lamination, and in particular include shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Tubing or pipe may be obtained by profile extrusion for uses in medical, potable water, land drainage applications or the like. Tubing or pipe may be unvulcanized or vulcanized. Vulcanization can be performed using, for example, a peroxide or silane during extrusion of the pipe. The profile extrusion process involves the extrusion of molten polymer through a die. The extruded tubing or pipe is then solidified by chill water or cooling air into a continuous extruded article.

The enhanced properties of the polyethylene compositions (and/or blends comprising polyethylene compositions) make them suitable for many end-use applications (e.g., of films, molded articles, or the like formed from the composition). Some examples include: transparent articles such as cook and food storage ware, and in other articles such as furniture (e.g., outdoor and/or garden furniture), automotive components, toys, sportswear and sporting equipment, medical devices, sterilizable medical devices and sterilization containers, nonwoven fibers and fabrics (and articles therefrom such as drapes, gowns, filters, hygiene products, diapers, and films), oriented films, sheets, tubes, pipes, packaging, bags, sacks, coatings, caps, closures, crates, pallets, cups, non-food containers, pails, insulation, wire and cable jacketing, agricultural films, geomembranes, playground equipment, boat and water craft components, and other such articles. In particular, the compositions are suitable for automotive components such as bumpers, grills, trim parts, dashboards, instrument panels, exterior door and hood components, spoiler, wind screen, hub caps, mirror housing, body panel, protective side molding, and other interior and external components associated with automobiles, trucks, boats, and other vehicles.

Other examples of useful articles and goods may include: labware, such as roller bottles for culture growth and media bottles, office floor mats, instrumentation sample holders and sample windows; liquid storage containers such as bags, pouches, and bottles for storage and IV infusion of blood or solutions; packaging material including those for medical devices or drugs including unit-dose or other blister or bubble pack as well as for wrapping or containing food preserved by irradiation. Other useful items include packaging materials for medical devices or food which is irradiated including trays, as well as stored liquid, such as water, milk, or juice containers including unit servings and bulk storage containers.

Extrusion Coating

A polyethylene composition (and/or blends comprising polyethylene compositions) may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetics attributes of the non-polymer substrate. In this process, the substrate is typically fed from a roll into a molten polymer as the polymer is extruded from a slot die, which is similar to a cast film process. The resultant structure is cooled, typically with a chill roll or rolls, and would into finished rolls.

Extrusion coating materials are typically used in food and non-food packaging, pharmaceutical packaging, and manufacturing of goods for the construction (insulation elements) and photographic industries (paper).

Foamed Articles

The polymers and compositions (including polyethylene compositions and blends thereof) described above may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

EXAMPLES

Polymerization Process Description

Inventive examples I-1, I-2, and I-3 are polyethylene compositions formed in a slurry loop reactor operating at the conditions as set forth in Table 1. After the polymerization process, the resulting slurry was separated from the diluent and dried. From there, the polymer was sent to the finishing section.

TABLE 1

Example Process Conditions

| Property or Condition | Target or Range |
|---|---|
| Pressure | 550 psig |
| Hydrogen concentration (in reactor) | 0.2-0.5 mol % |
| Temperature | 213-215° F. |

TABLE 1-continued

Example Process Conditions

| Property or Condition | Target or Range |
|---|---|
| Co-monomer to ethylene feed ratio | 8.5-10.0 lb comonomer per hundred lb ethylene |
| Ethylene concentration | 4.0-5.0 wt % |

Polymer Properties

Tables 2a and 2b illustrate polymer properties (resin properties and physical properties, respectively) of the inventive examples I-1, I-2, and I-3 formed per the above description. For comparison, Tables 2a and 2b also include the same properties from Comparative Example C-1 (Paxon™ AL55-003 HDPE, a unimodal HDPE available from ExxonMobil Chemical Company) and C-2 (HD9830.2 HDPE, a bimodal HDPE available from ExxonMobil Chemical Company). Each property in Tables 2a and 2b is measured as indicated in the table; where not indicated, the property was measured as previously detailed in connection with that property's description in this disclosure. In addition, molecular weight distributions for the inventive and comparative examples were determined via GPC4D (using the conventional method), as per the previous description of this measurement method. FIG. 1 shows the resultant distributions.

TABLE 2a

Resin Properties - Inventive and Comparative Example Polymers

| Property | C-1 | C-2 | I-1 | I-2 | I-3 |
|---|---|---|---|---|---|
| Weight average molecular weight, $M_w$ (g/mol) (IR) | 126,695 | 156,069 | 172,096 | 174,587 | 177,892 |
| Z-average molecular weight, $M_z$ (g/mol) (IR) | 877,247 | 994,010 | 1,621,085 | 1,606,364 | 1,643,761 |
| Z + 1-average molecular weight, $M_{z+1}$ (g/mol) (IR) | 2,684,306 | 2,541,644 | 3,869,148 | 3,726,700 | 3,881,836 |
| Number average molecular weight, $M_n$ (g/mol) (IR) | 16,841 | 11,545 | 10,011 | 10,410 | 10,610 |
| Comonomer content, Cn (wt %) | 0.65 | 0.58 | 0.69 | 0.69 | 0.37 |
| Mw/Mn Ratio (—) | 7.52 | 13.52 | 17.19 | 16.77 | 16.77 |
| Mz/Mw Ratio (—) | 6.9 | 6.4 | 9.4 | 9.2 | 9.2 |
| Mz/Mn Ratio (—) | 52.1 | 86.1 | 161.9 | 154.3 | 154.9 |
| $g'_{LCB}$ (—) (Vis. Avg.) | 0.920 | 0.707 | 0.947 | 0.953 | 0.958 |
| Peak Area, $A_1$ (%) | 14.8 | / | 20.9 | 20.8 | 20.4 |
| Peak Area, $A_2$ (%) | 84.8 | 99.3 | 78.0 | 78.2 | 78.6 |
| Total Integ. Area (%) | 99.6 | 99.3 | 98.9 | 99.0 | 98.9 |
| Peak Max. Temperature, $T_1$ (° C.) | 91.45 | / | 89.37 | 89.05 | 89.05 |
| Peak Max. Temperature, $T_2$ (° C.) | 96.89 | 98.17 | 96.73 | 96.73 | 96.73 |
| Peak Min. Temperature, $T_3$ (° C.) | 92.09 | / | 92.09 | 92.09 | 91.93 |
| $\Delta T_3 - T_1$ (° C.) | 0.6 | / | 2.7 | 3.0 | 2.9 |
| $\Delta T_2 - T_1$ (° C.) | 5.4 | / | 7.4 | 7.7 | 7.7 |
| CDBI (%) | 18.82 | 3.17 | 22.97 | 19.62 | 19.56 |
| Complex Viscosity at 628 rad/s | 386 | 403 | 390 | 421 | 427 |
| Complex Viscosity at 100 rad/s | 1,243 | 1,369 | 1,265 | 1,380 | 1,413 |
| Complex Viscosity at 0.01 rad/s | 99,951 | 72,466 | 56,295 | 64,363 | 71,956 |
| Degree of Shear Thinning, DST (—) | 0.988 | 0.981 | 0.978 | 0.979 | 0.980 |
| DSC, Melt. Temp. (° C.) | 132.1 | 132.7 | 130.5 | 130.5 | 130.9 |
| DSC, Cryst. Temp. (° C.) | 118.8 | 117.4 | 117.3 | 117.3 | 117.3 |
| DSC Cryst. Kinetics @124° C., $t_{peak}$ (min) | 2.7 | 15.0 | 16.8 | 15.5 | 14.5 |
| HIGH -LOW Ratio | 4.7 | 7.6 | 15.4 | 12.4 | 11.5 |

TABLE 2b

Physical Properties - Inventive and Comparative Example Polymers

| Property | C-1 | C-2 | I-1 | I-2 | I-3 |
|---|---|---|---|---|---|
| Melt index, $I_{2.16}$ (g/10 min) | 0.31 | 0.37 | 0.43 | 0.39 | 0.34 |

TABLE 2b-continued

Physical Properties - Inventive and Comparative Example Polymers

| Property | C-1 | C-2 | I-1 | I-2 | I-3 |
|---|---|---|---|---|---|
| Melt index, $I_{21.6}$ (g/10 min) | 35.1 | 35.7 | 37.2 | 33.8 | 31.7 |
| Melt index ratio, $I_{21.6}/I_{2.16}$ (—) | 113.3 | 96.5 | 86.5 | 86.6 | 93.1 |
| Density, ρ (g/cm³) | 0.9555 | 0.9571 | 0.9557 | 0.9555 | 0.9556 |
| ESCR at 10% Igepal, Cond B (ASTM D1693) | 19.5 | 70.4 | 63.7 | 59.1 | 51.2 |
| ESCR at 100% Igepal, Cond B (ASTM D1693) | 24.8 | 325.4 | 85 | 126.5 | 149.6 |
| NCLS (10% Igepal, 50° C., 600 psi) | 4.32 | 20.66 | 13.6 | 17.54 | 15.62 |
| Izod Impact at 23° C. Ft-lb/in (ASTM D256 Method A) | 2.22 | 1.58 | 1.835 | 1.94 | 2.22 |
| Izod Impact at −40° C. Ft-lb/in (ASTM D256 Method A) | 1.09 | 0.96 | 1.01 | 1.06 | 1.09 |
| Charpy Impact at 23° C. (KJ/m²) (ISO 179_1/1eA) | 9.30 | 7.00 | 7.21 | 7.84 | 8.59 |
| Shore D Hardness (ASTM D2240) | 62 | 62.4 | 61.4 | 62 | 61.6 |
| Vicat 10N at 50° C./hr (° C.) (ASTM D1525) | 125.7 | 126.1 | 124.6 | 124.7 | 124.6 |
| Tensile Stress at Yield with 2 in/min (psi) (ASTM D638) | 4,093 | 4,223 | 4,026 | 3,994 | 3,993 |
| Flex at 0.5 in/min, 1% Secant Modulus (kpsi) (ASTM D790, Proc. B) | 204 | 212 | 195 | 171 | 189 |

Figure 3:
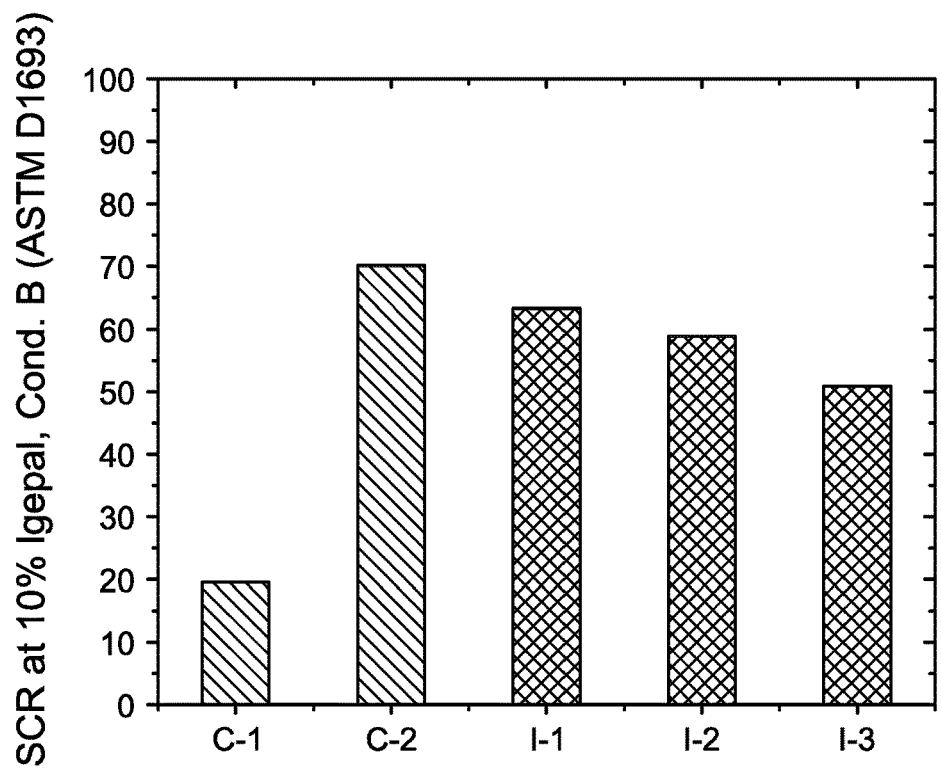
FIG. 3 is a bar chart showing environmental stress crack resistance (ASTM D1693, 10% Igepal. Cond. B) of polyethylene compositions in accordance with various embodiments of the present disclosure as well as comparative resins.
Figure 4:
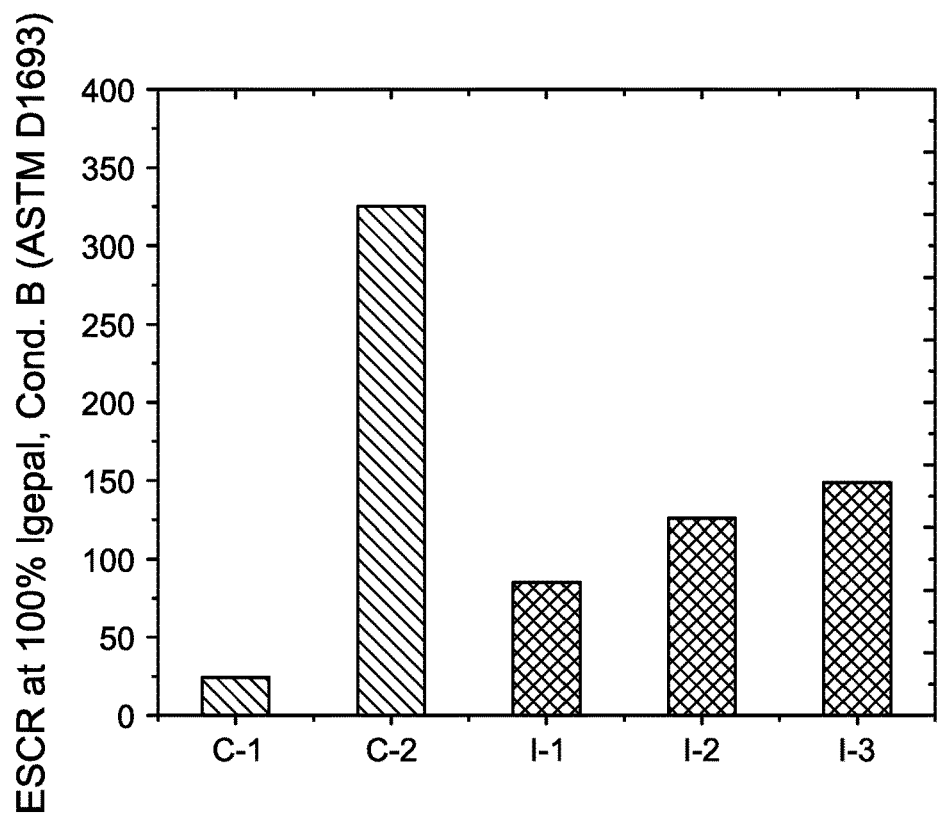
FIG. 4 is a bar chart showing environmental stress crack resistance (ASTM D1693, 100% Igepal, Cond. B) of polyethylene compositions in accordance with various embodiments of the present disclosure as well as comparative resins.

The resin properties (Table 2a) illustrate that the inventive examples of polyethylene compositions in accordance with embodiments of the present disclosure have a substantial fraction of high molecular weight polymer chains, while FIG. 1 shows that the resins retain their unimodal molecular weight distribution. Furthermore, Table 2a illustrates the advantageous balance of properties achieved by the present polyethylene compositions, exhibiting a blend of the best properties of bimodal and unimodal HDPE. Comparable to bimodal C-2, the present inventive examples I-1, I-2, and I-3 all have close values of stress crack resistance: ESCR at 10% Igepal ranges from 51.2 to 63.7 hours for inventive samples, favorably comparing to 70.4 hours for bimodal C-2, while being substantially higher than the other unimodal HDPE. C-1; and ESCR at 100% Igepal ranges from 85 to 149.6 hours for inventive samples, comparing acceptably well against 325.4 hours for the bimodal C-2, and being several multiples higher than the 24.8 hours achieved by the other unimodal sample, C-1, and 100% Igepal). FIGS. 3 and 4 graphically illustrate the ESCR values for 10% Igepal and 100% Igepal, respectively. On the other hand, the inventive samples outperform the bimodal C-2 in impact tests (Izod Impact, Charpy Impact), instead achieving similar values to the unimodal C-1 in these properties.

Crystallinity

Furthermore, TREF was undertaken, also as previously described herein, for inventive examples I-1, I-2, and I-3; as well as for the comparative examples. The TREF plots are shown in FIGS. 2a and 2b; and Table 3 further reports various values associated with the TREF plot. The plots and value reported in Table 3 confirm that the present polyethylene compositions exhibit multimodal crystalline fractions in TREF: as can be seen in Table 3 and in FIGS. 2a and 2b, the present inventive examples exhibit both the major peak at around 96.73° (T2) as well as a very well-defined "secondary" peak at about 89.05-89.37° C. (T1). This is as compared to the bimodal HDPE C-2, which exhibits no secondary peak on TREF plot; and unimodal C-1, which exhibits a very minor secondary peak, but at 91.45° C. Further, area under the curve A1 (defined per the previous description in this specification) for example C-1 is only approximately 14.8%, compared to >20% for all inventive examples tested, while area A2 is notably larger for C-1, as compared to the inventive examples. Since C-2, as noted, exhibited no secondary peak, calculation of relative areas associated with each peak cannot even be carried out.

TABLE 3

Crystallinity by TREF

| Property | C-1 | C-2 | I-1 | I-2 | I-3 |
|---|---|---|---|---|---|
| Peak Area, $A_1$ (%) | 14.8 | / | 20.9 | 20.8 | 20.4 |
| Peak Area, $A_2$ (%) | 84.8 | 99.3 | 78.0 | 78.2 | 78.6 |
| Total Integ. Area (%) | 99.6 | 99.3 | 98.9 | 99.0 | 98.9 |
| Peak Max. Temperature, $T_1$ (° C.) | 91.45 | / | 89.37 | 89.05 | 89.05 |
| Peak Max. Temperature, $T_2$ (° C.) | 96.89 | 98.17 | 96.73 | 96.73 | 96.73 |
| Peak Min. Temperature, $T_3$ (° C.) | 92.09 | / | 92.09 | 92.09 | 91.93 |
| $\Delta T_3 - T_1$ (° C.) | 0.6 | / | 2.7 | 3.0 | 2.9 |
| $\Delta T_2 - T_1$ (° C.) | 5.4 | / | 7.4 | 7.7 | 7.7 |

Stress Crack Resistance

Figure 5:
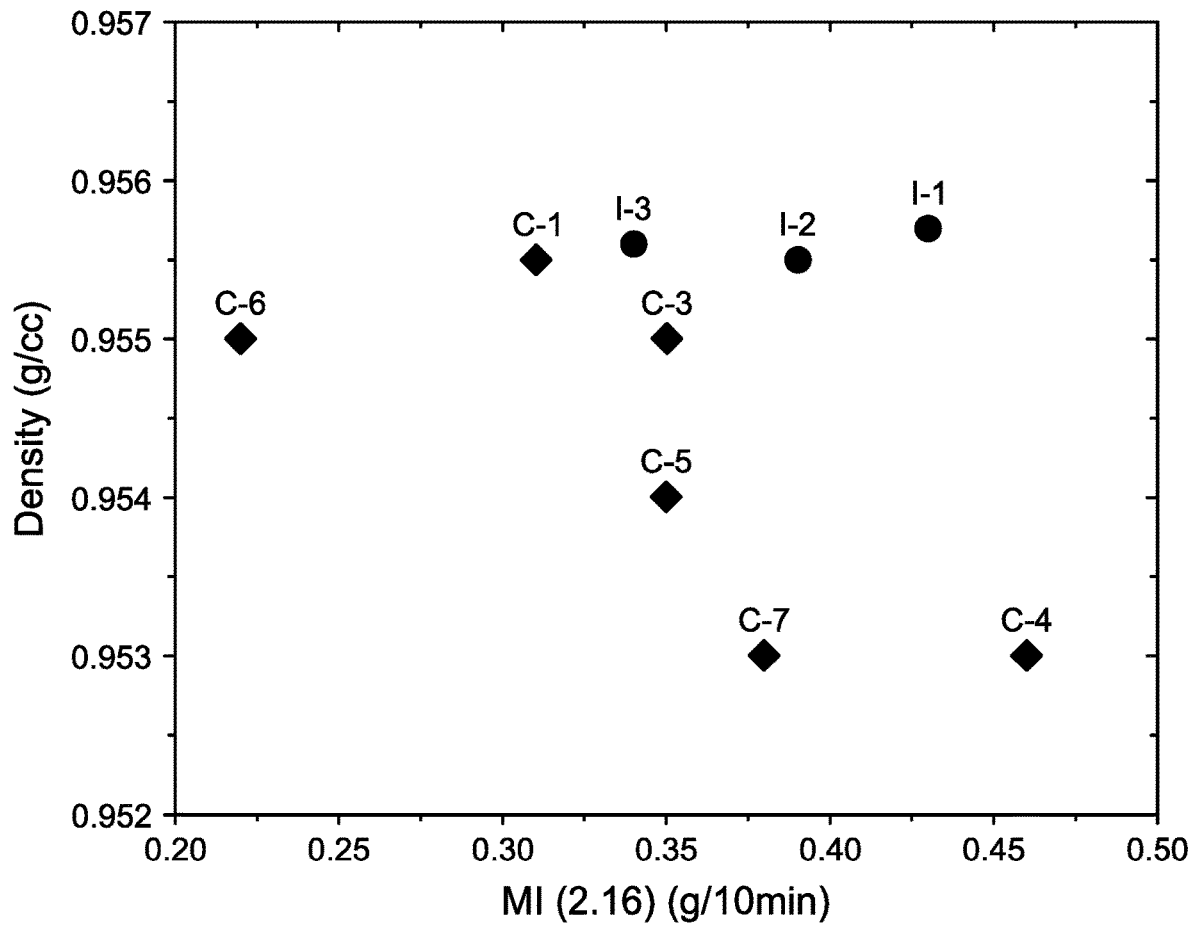
FIG. 5 is a plot of density vs. melt index (MI) of polyethylene compositions in accordance with various embodiments of the present disclosure as well as comparative resins.

ESCR of the inventive resins was more broadly compared against additional commercial unimodal HDPE examples, at 100% Igepal ASTM D1693, Condition B. Results are charted below in Table 4 (where MI and density were determined by ASTM D1238 and ASTM D1505, respectively). FIG. 5 plots the density vs. MI of the inventive resins I-1 and I-2, as well as the various comparative unimodal resins. In Table 4 and FIG. 5, C-1 is again Paxon AL55-003; C-3 is Marlex® HHM 5502BN polyethylene from Chevron Phillips Chemical; C-4 is Unival™ DMDA-6320 NT7 HDPE resin available from The Dow Chemical Company, C-5 is Marlex. 9512H polyethylene available from Chevron Phillips Chemical; C-6 is HP55-25-155 from Ineos, and C-7 is Unival™ DMDA-6200 NT7 from The Dow Chemical Company. As can be seen, although the inventive resins fall in-line with typical density/MI values of the other unimodal resins, they exhibit far superior ESCR (more than double the closest unimodal commercial example), showing a very surprising result for a unimodal polyethylene composition.

TABLE 4

ESCR versus MI, Density

|  | C-1 | C-3 | C-4 | C-5 | C-6 | C-7 | I-1 | I-2 | I-3 |
|---|---|---|---|---|---|---|---|---|---|
| Melt Index ($I_{2.16}$) g/10 min | 0.31 | 0.35 | 0.46 | 0.35 | 0.22 | 0.38 | 0.43 | 0.39 | 0.34 |
| Density, g/cm$^3$ | 0.9555 | 0.955 | 0.953 | 0.954 | 0.955 | 0.953 | 0.9557 | 0.9555 | 0.9556 |
| ESCR, 100% Igepal | 24.8 | 24 | 40 | 60 | 80 | 50 | 85 | 126.5 | 149.6 |

Rheology

Figure 6:
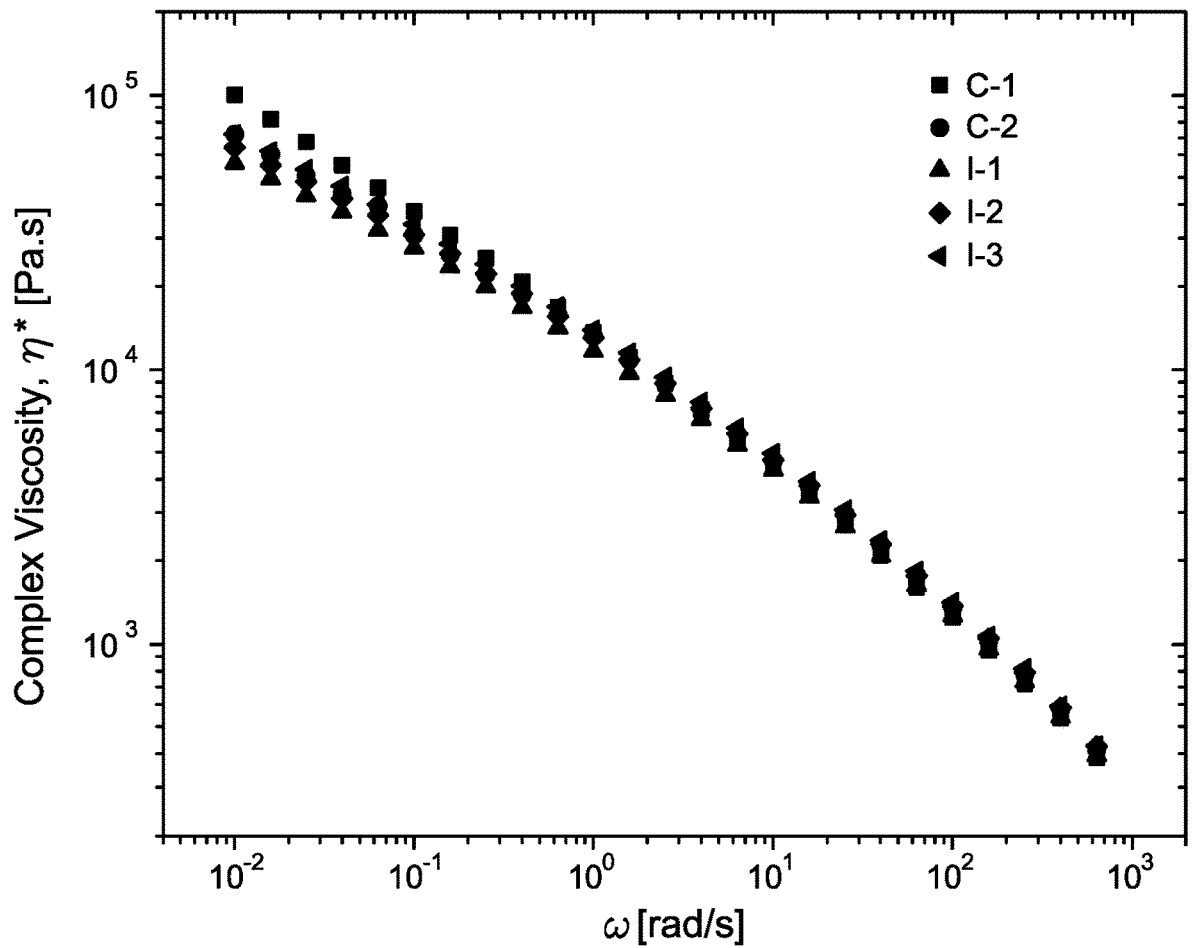
FIG. 6 is a plot showing complex viscosity vs. shear rate (rad/s) for polyethylene compositions in accordance with various embodiments of the present disclosure as well as comparative resins.

Complex viscosity at various shear rates was determined for C-1, C-2, and I-1 through I-3 using SAOS measurements as described previously. FIG. 6 is a plot of the complex viscosity of these samples. FIG. 6 illustrates the shear-thinning rheology of all samples, but also shows the advantageously lower complex viscosity at low shear rates for the unimodal inventive resins and bimodal C-2, as compared to unimodal C-1, showing another advantage obtained by the unimodal resins I-1, I-2, and I-3.

Blends

A 50/50 (wt %) blend of I-1 and PCR resin (KW Plastics Copolymer PCR KWR102MC resin, a mixed-density recycled HDPE having properties as reported in Table 5 below)) was made by dry blending the two resins in a cone blender, then melt blending in a twin screw extruder to insure homogeneity. The resulting pellets were then compression molded into plaques per ASTM D4703 and tested. In addition, a 50/50 blend of C-1 and the PCR was likewise made and tested, as were 50/50 blends of PCR and C-3 (as above, this is Marlex® HHM 5502BN from Chevron Phillips Chemical); as well as of PCR and C-8 (ExxonMobil™ HDPE HYA 600 high density polyethylene from ExxonMobil Chemical Company). Properties of the blends are reported in Table 5 below.

TABLE 5

PCR Blend Properties

| Sample Blend (50/50 wt %) | MI | HLMI | MIR | Density (g/cm$^3$) | ESCR 100% Igepal (hr) | NCLS (10% Igepal, 50 C., 600 psi) (hr) | Flex @ 0.05 in/min 1% Secant Modulus (psi) | Izod D256. Method A @ 23° C. Ft-lb/in | Izod D256, Method A @ -18 C. Ft-lb/in | Shore Hardness D |
|---|---|---|---|---|---|---|---|---|---|---|
| PCR | 0.71 | 63.56 | 89.5 | 0.959 | 5.2 | 3.4 | 151000 | 0.72 | / | 61.14 |
| C-1/PCR | 0.46 | 49.8 | 108.3 | 0.959 | 10.3 | 4.9 | 162000 | 0.76 | 0.72 | 61.9 |
| C-3/PCR | 0.48 | 46.3 | 96.5 | 0.958 | 20.9 | 5.8 | 142000 | 0.92 | 0.63 | 61.6 |
| C-8/PCR | 0.49 | 43.8 | 89.3 | 0.959 | 14.7 | 7.8 | 162000 | 1.02 | 0.81 | 60.5 |
| I-1/PCR | 0.49 | 48.1 | 98.1 | 0.959 | 39.6 | 8.9 | 142000 | 0.95 | 0.79 | 61.1 |

In addition, the C-1 alone, PCR alone, and PCR/I-1 blend were tested for stress crack resistance using the Notched Constant Ligament Stress (NCLS) test following the methods previously described for NCLS, with 10% Igepal at 50° C. and using a 600 psi pressure. The PCR alone and C-1 alone were also tested. Results are reported in Table 6 below.

TABLE 6

Stress Crack Resistance of PCR Blend

| Property | PCR alone | C-1 | PCR + I-1 50/50 (wt %) |
|---|---|---|---|
| NCLS (10% Igepal, 50° C., 600 psi) | 3.4 | 5.2 | 8.9 |

Typically, PCR loading is expected to reduce properties, but surprisingly, the 50/50 blend outperformed neat unimodal C-1 in the NCLS testing. Also, the PCR/I-1 blends provided substantially better ESCR and NCLS as compared to the other 50/50 blends made with C-1, C-8, and C-9.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

We claim:

1. A polyethylene composition comprising:
    80 wt % to 99.9 wt % ethylene-derived content, and 0.1 wt % to 20 wt % units derived from one or more $C_3$ to $C_{40}$ α-olefin comonomers, each wt % being based on ethylene content plus $C_3$ to $C_{40}$ α-olefin comonomer content;
    wherein the polyethylene composition has:
        a density within the range from 0.935 to 0.975 g/cm$^3$;
        Melt index ($I_{2.16}$) within the range from 0.1 to 1 g/10 min;
    further wherein the polyethylene composition exhibits either or both of: (i) Environmental Stress Crack Resistance (ESCR) determined per ASTM D1693 (10% Igepal, Cond. B) within the range from 45 to 80 hours and (ii) ESCR determined per ASTM D1693 (100% Igepal, Cond. B) within the range from 70 to 250 hours; and
    further wherein the polyethylene composition has unimodal molecular weight distribution and exhibits multiple distinct crystalline fractions as determined by temperature rising elution fractionation (TREF).

2. The polyethylene composition of claim 1, wherein the $C_3$ to $C_{40}$ α-olefin comonomers comprise 1-butene; 1-hexene, 1-octene, or combinations thereof;
    further wherein the ethylene content is 98.5 wt % to 99.9 wt % and the comonomer content is 0.1 wt % to 1.5 wt %, said wt % s on the basis of total mass of ethylene and comonomer content; and
    further wherein the polyethylene composition has 2.0 to 5.0 ppm Cr and 6 to 15 ppm Ti, on the basis of total mass of the polyethylene composition.

3. The polyethylene composition of claim 1, further having:
    weight-average molecular weight (Mw) within the range from 90,000 to 300,000 g/mol;
    number-average molecular weight (Mn) within the range from 5,000 g/mol to 30,000 g/mol;
    Z-average molecular weight (Mz) within the range from 700,000 g/mol to 3.0 million g/mol; and
    Mz/Mn ratio within the range from 125 to 300.

4. The polyethylene composition of claim 1, further having
    complex viscosity (628 rad/s, 190° C.) within the range from 200 to 800 Pa*s;
    complex viscosity (100 rad/s, 190° C.) of 3,000 Pa*s or less;
    complex viscosity (0.01 rad/s, 190° C.) of 80,000 Pa*s or less; and
    degree of shear thinning (DST) within the range from 0.965 to 0.990.

5. The polyethylene composition of claim 1, wherein the polyethylene composition further has:
    (a) Izod Impact strength (23° C., ASTM D256 Method A) within the range from 1.8 to 2.5 Ft-lb/in;
    (b) Izod Impact strength (−40° C., ASTM D256 Method A) within the range from 1.0 to 1.20 Ft-lb/in); and
    (c) Charpy Impact Strength (ISO 179-1/1eA) within the range from 7 to 10.5 KJ/m$^2$.

6. The polyethylene composition of claim 1, further having:
    (a) Z-plus one average molecular weight ($M_{z+1}$) within the range from 2,750,000 g/mol to 4,500,000 g/mol; and
    (b) melt index ratio ($I_{21.6}/I_{2.16}$) within the range from 80 to 94.

7. The polyethylene composition of claim 1, having high-low ratio within the range from 8 to 20, where high-low ratio is defined as $$\frac{M_z HLMI}{M_n \eta_{low}}$$

where HLMI is high load meld index ($I_{21.6}$) and $\eta_{low}$ is the complex viscosity (628 rad/s, 190° C.).

8. The polyethylene composition of claim 1, wherein the polyethylene composition exhibits Notched Constant Ligament Stress (NCLS) per ASTM F2136 (10% Igepal, 50° C., 600 psi) within the range from 13 to 20 hours.

9. The polyethylene composition of claim 1, wherein the multiple distinct crystalline fractions comprise a first crystalline fraction having a peak at T1 on a TREF curve and a second crystalline fraction having a peak at T2 on the TREF curve; wherein a local minimum at T3 on the TREF curve defines a valley between the first and second crystalline fractions' peaks; and T1 is within the range from 85° C. to 94° C., T2 is within the range from 96° C. to 99° C.; and T3 is within the range from 87° C. to 96° C., provided that T3-T1>1° C. and T2-T1>5.5° C.

10. The polyethylene composition of claim 9, wherein T3-T1>2° C. and T2-T1>7° C.

11. The polyethylene composition of claim 9, wherein the area A1 under the TREF curve (bounded by T=40° C. and T=T3° C.) and the area A2 under the TREF curve (bounded by T=T3° C. and T=120° C.) are such that A1 is at least 15% of the total area A1+A2.

12. A polyethylene composition having 95 wt % to 99.9 wt % units derived from ethylene and 0.1 wt % to 5 wt % units derived from a $C_3$ to $C_{20}$ α-olefin, the polyethylene composition having:

a density within the range from 0.935 to 0.975 g/cm³;

a unimodal molecular weight distribution as determined by GPC4D; and multiple distinct crystalline fractions as determined by temperature rising elution fractionation (TREF); wherein (a) the multiple distinct crystalline fractions comprise a first crystalline fraction having a peak at T1 on a TREF curve and a second crystalline fraction having a peak at T2 on the TREF curve; wherein a local minimum at T3 on the TREF curve defines a valley between the first and second crystalline fractions' peaks; and T1 is within the range from 88° C. to 92° C., T2 is within the range from 94° C. to 100° C., and T3 is within the range from 91° C. to 94° C.; provided further that T3-T1>1° C. and T2-T1>5.5° C.; and (b) the area A1 under the TREF curve (bounded by T=40° C. and T=T3° C.) and the area A2 under the TREF curve (bounded by T=T3° C. and T=120° C.) are such that A1 is at least 15% of the total area A1+A2.

13. The polyethylene composition of claim 12, having one or more of the following properties:

(c) Z-average molecular weight (Mz) within the range from 1.0 million g/mol to 3.0 million g/mol;

(d) Mz/Mn ratio within the range from 125 to 300;

(e) Melt index $I_{2.16}$ within the range from 0.1 to 10 g/10 min; and (f) ESCR determined per ASTM D1693 (100% Igepal, Cond. B) within the range from 70 to 200 hours.

14. The polyethylene composition of claim 13, having all of the properties (c)-(f).

15. The polyethylene composition of claim 12, further having high-low ratio within the range from 8 to 20, where high-low ratio is defined as $$\frac{M_z HLMI}{M_n \eta_{low}}$$

where HLMI is high load meld index ($I_{21.6}$) and $\eta_{low}$ is the complex viscosity (628 rad/s, 190° C.).

16. A blend comprising the polyethylene composition of claim 1 and a post-consumer recycled (PCR) polymer material.

17. The blend of claim 16, comprising from 25 to 65 wt % of the PCR polymer material and 35 to 75 wt % of the polyethylene composition, said wt % based upon the total of PCR polymer material and polyethylene composition in the blend.

18. The blend of claim 17, having ESCR (100% Igepal) within the range from 25 to 60 hours.

* * * * *